(12) United States Patent
Sampath et al.

(10) Patent No.: US 9,184,870 B2
(45) Date of Patent: Nov. 10, 2015

(54) SYSTEMS AND METHODS FOR CONTROL CHANNEL SIGNALING

(75) Inventors: Hemanth Sampath, San Diego, CA (US); Alexei Gorokhov, San Diego, CA (US); Aamod Khandekar, San Diego, CA (US); Edward Harrison Teague, San Diego, CA (US); David Jonathan Julian, San Diego, CA (US); Tamer Kadous, San Diego, CA (US); Arak Sutivong, Bangkok (TH)

(73) Assignee: QUALCOMM Incorporated, San Diego, CA (US)

( * ) Notice: Subject to any disclaimer, the term of this patent is extended or adjusted under 35 U.S.C. 154(b) by 882 days.

(21) Appl. No.: 11/261,836

(22) Filed: Oct. 27, 2005

(65) Prior Publication Data

US 2006/0223449 A1    Oct. 5, 2006

Related U.S. Application Data

(60) Provisional application No. 60/667,705, filed on Apr. 1, 2005.

(51) Int. Cl.
| | |
|---|---|
| *H04B 7/14* | (2006.01) |
| *H04L 1/00* | (2006.01) |
| *H04B 1/00* | (2006.01) |
| *H04W 72/00* | (2009.01) |
| *H04W 4/00* | (2009.01) |

(Continued)

(52) U.S. Cl.
CPC ............ *H04L 1/0028* (2013.01); *H04L 1/0026* (2013.01); *H04L 5/0053* (2013.01); *H04L 25/0204* (2013.01); *H04L 25/03343* (2013.01); *H04L 2025/03414* (2013.01); *H04L 2025/03426* (2013.01); *H04L 2025/03802* (2013.01)

(58) Field of Classification Search
USPC ........................ 455/69, 450, 24; 370/332, 334
See application file for complete search history.

(56) References Cited

U.S. PATENT DOCUMENTS

| | | | |
|---|---|---|---|
| 4,393,276 | A | 7/1983 | Steele |
| 4,554,668 | A | 11/1985 | Deman et al. |

(Continued)

FOREIGN PATENT DOCUMENTS

| | | |
|---|---|---|
| CA | 2348137 | 11/2001 |
| CA | 2477536 | 9/2003 |

(Continued)

OTHER PUBLICATIONS

Lau et al, "On the Design of MIMO Block-Fading Channels With Feedback-Link Capacity Constraint" IEEE Transactions on Communications, IEEE Service Center, Piscataway, NJ, US, vol. 52, No. 1, (Jan. 2004), pp. 62-70, XP001189908 ISSN: 0090-6778 p. 62, right-hand column, line 17-line 34, p. 63, left-hand column, line 11-line 22, p. 64, left-hand column, line 36, p. 65, left-hand column, line 4-right-hand column, line 15; figures 1, 2.

(Continued)

*Primary Examiner* — Huy C Ho
(74) *Attorney, Agent, or Firm* — Liem T. Do

(57) ABSTRACT

Methods and apparatuses are disclosed for providing flexible channel information feedback. In some cases this may be according to reporting types assigned by one or more sectors, with different reporting types for each sector. In other cases, a reporting mode is determined to determine the reporting types to be utilized.

28 Claims, 9 Drawing Sheets

(51) Int. Cl.
  *H04L 5/00* (2006.01)
  *H04L 25/02* (2006.01)
  *H04L 25/03* (2006.01)

(56) References Cited

U.S. PATENT DOCUMENTS

| | | | |
|---|---|---|---|
| 4,747,137 A | 5/1988 | Matsunaga |
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany |
| 5,406,551 A | 4/1995 | Saito et al. |
| 5,410,538 A | 4/1995 | Roche et al. |
| 5,455,839 A | 10/1995 | Eyuboglu |
| 5,465,253 A | 11/1995 | Rahnema |
| 5,491,727 A | 2/1996 | Petit |
| 5,513,379 A | 4/1996 | Benveniste et al. |
| 5,539,748 A | 7/1996 | Raith |
| 5,548,582 A | 8/1996 | Brajal et al. |
| 5,553,069 A | 9/1996 | Ueno et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang |
| 5,828,650 A | 10/1998 | Malkamaki et al. |
| 5,838,268 A | 11/1998 | Frenkel |
| 5,867,478 A | 2/1999 | Baum et al. |
| 5,870,393 A | 2/1999 | Yano et al. |
| 5,887,023 A | 3/1999 | Mabuchi |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,949,814 A | 9/1999 | Odenwalder et al. |
| 5,953,325 A | 9/1999 | Willars |
| 5,955,992 A | 9/1999 | Shattil |
| 5,956,642 A | 9/1999 | Larsson et al. |
| 5,995,992 A | 11/1999 | Eckard |
| 5,999,826 A | 12/1999 | Whinnett |
| 6,002,942 A | 12/1999 | Park |
| 6,016,123 A | 1/2000 | Barton et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng |
| 6,075,797 A | 6/2000 | Thomas |
| 6,076,114 A | 6/2000 | Wesley |
| 6,088,345 A | 7/2000 | Sakoda et al. |
| 6,088,592 A | 7/2000 | Doner et al. |
| 6,108,323 A | 8/2000 | Gray |
| 6,108,550 A | 8/2000 | Wiorek et al. |
| 6,112,094 A | 8/2000 | Dent |
| 6,128,776 A | 10/2000 | Kang |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | Van Nee |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Muitaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurting et al. |
| 6,584,140 B1 | 6/2003 | Lee |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous |
| 6,654,339 B1 | 11/2003 | Bohnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng |
| 6,675,012 B2 | 1/2004 | Gray |
| 6,678,318 B1 | 1/2004 | Lai |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Zehavi et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic |
| 6,754,511 B1 | 6/2004 | Halford et al. |
| 6,763,009 B1 | 7/2004 | Bedekar et al. |

(56) References Cited

U.S. PATENT DOCUMENTS

| | | |
|---|---|---|
| 6,765,969 B1 | 7/2004 | Vook et al. |
| 6,776,165 B2 | 8/2004 | Jin |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu |
| 6,870,826 B1 | 3/2005 | Ishizu |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,934,266 B2 | 8/2005 | Dulin et al. |
| 6,934,275 B1 | 8/2005 | Love et al. |
| 6,934,340 B1 | 8/2005 | Dollard |
| 6,940,827 B2 | 9/2005 | Li et al. |
| 6,940,842 B2 | 9/2005 | Proctor, Jr. |
| 6,940,845 B2 | 9/2005 | Benveniste |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,023,880 B2 | 4/2006 | El-Maleh et al. |
| 7,039,356 B2 | 5/2006 | Nguyen |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,188,300 B2 | 3/2007 | Eriksson et al. |
| 7,200,177 B2 | 4/2007 | Miyoshi |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji |
| 7,257,423 B2 | 8/2007 | Iochi |
| 7,260,153 B2 | 8/2007 | Nissani et al. |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,349,371 B2 | 3/2008 | Schein |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |

(56) References Cited

U.S. PATENT DOCUMENTS

| | | | |
|---|---|---|---|
| 7,394,865 B2 | 7/2008 | Borran et al. | |
| 7,403,745 B2 | 7/2008 | Dominique et al. | |
| 7,403,748 B1 | 7/2008 | Keskitalo et al. | |
| 7,406,119 B2 | 7/2008 | Yamano et al. | |
| 7,406,336 B2 | 7/2008 | Astely et al. | |
| 7,411,898 B2 | 8/2008 | Erlich et al. | |
| 7,412,212 B2 | 8/2008 | Hottinen | |
| 7,418,043 B2 | 8/2008 | Shattil | |
| 7,418,246 B2 | 8/2008 | Kim et al. | |
| 7,423,991 B2 | 9/2008 | Cho et al. | |
| 7,426,426 B2 | 9/2008 | Van Baren | |
| 7,428,426 B2 | 9/2008 | Kiran et al. | |
| 7,433,661 B2 | 10/2008 | Kogiantis et al. | |
| 7,437,164 B2 | 10/2008 | Agrawal et al. | |
| 7,443,835 B2 | 10/2008 | Lakshmi Narayanan et al. | |
| 7,447,270 B1 | 11/2008 | Hottinen | |
| 7,450,532 B2 | 11/2008 | Chae et al. | |
| 7,450,548 B2 | 11/2008 | Haustein et al. | |
| 7,460,466 B2 | 12/2008 | Lee et al. | |
| 7,463,698 B2 | 12/2008 | Fujii et al. | |
| 7,468,943 B2 | 12/2008 | Gu et al. | |
| 7,469,011 B2 | 12/2008 | Lin et al. | |
| 7,471,963 B2 | 12/2008 | Kim et al. | |
| 7,483,408 B2 | 1/2009 | Bevan et al. | |
| 7,483,719 B2 | 1/2009 | Kim et al. | |
| 7,486,735 B2 | 2/2009 | Dubuc et al. | |
| 7,492,788 B2 | 2/2009 | Zhang et al. | |
| 7,499,393 B2 | 3/2009 | Ozluturk | |
| 7,508,748 B2 | 3/2009 | Kadous | |
| 7,508,842 B2 | 3/2009 | Baum et al. | |
| 7,512,096 B2 | 3/2009 | Kuzminskiy et al. | |
| 7,545,867 B1 | 6/2009 | Lou et al. | |
| 7,548,506 B2 | 6/2009 | Ma et al. | |
| 7,551,546 B2 | 6/2009 | Ma et al. | |
| 7,551,564 B2 | 6/2009 | Mattina | |
| 7,567,621 B2 | 7/2009 | Sampath et al. | |
| 7,573,900 B2 | 8/2009 | Kim et al. | |
| 7,599,327 B2 | 10/2009 | Zhuang | |
| 7,616,955 B2 | 11/2009 | Kim | |
| 7,627,051 B2 | 12/2009 | Shen et al. | |
| 7,664,061 B2 | 2/2010 | Hottinen | |
| 7,676,007 B1 | 3/2010 | Choi et al. | |
| 7,684,507 B2 | 3/2010 | Levy | |
| 7,724,777 B2 | 5/2010 | Sutivong et al. | |
| 7,768,979 B2 | 8/2010 | Sutivong et al. | |
| 7,899,497 B2 | 3/2011 | Kish et al. | |
| 7,916,624 B2 | 3/2011 | Laroia et al. | |
| 7,924,699 B2 | 4/2011 | Laroia et al. | |
| 7,990,843 B2 | 8/2011 | Laroia et al. | |
| 7,990,844 B2 | 8/2011 | Laroia et al. | |
| 8,014,271 B2 | 9/2011 | Laroia et al. | |
| 8,045,512 B2 | 10/2011 | Khandekar et al. | |
| 8,095,141 B2 | 1/2012 | Teague | |
| 8,098,568 B2 | 1/2012 | Laroia et al. | |
| 8,098,569 B2 | 1/2012 | Laroia et al. | |
| 8,199,634 B2 | 6/2012 | Laroia et al. | |
| 8,218,425 B2 | 7/2012 | Laroia et al. | |
| 8,223,627 B2 | 7/2012 | Laroia et al. | |
| 8,295,154 B2 | 10/2012 | Laroia et al. | |
| 8,446,892 B2 | 5/2013 | Ji et al. | |
| 8,462,859 B2 | 6/2013 | Sampath et al. | |
| 8,477,684 B2 | 7/2013 | Khandekar et al. | |
| 2001/0021180 A1 | 9/2001 | Lee et al. | |
| 2001/0024427 A1 | 9/2001 | Suzuki | |
| 2001/0030948 A1 | 10/2001 | Tiedemann, Jr. | |
| 2001/0053140 A1 | 12/2001 | Choi et al. | |
| 2001/0055294 A1 | 12/2001 | Motoyoshi | |
| 2002/0000948 A1* | 1/2002 | Chun et al. | 343/853 |
| 2002/0015405 A1 | 2/2002 | Sepponen et al. | |
| 2002/0018157 A1 | 2/2002 | Zhang et al. | |
| 2002/0044524 A1 | 4/2002 | Laroia et al. | |
| 2002/0061742 A1 | 5/2002 | Lapaille et al. | |
| 2002/0077152 A1 | 6/2002 | Johnson et al. | |
| 2002/0085521 A1 | 7/2002 | Tripathi et al. | |
| 2002/0090004 A1 | 7/2002 | Rinchiuso | |
| 2002/0090024 A1 | 7/2002 | Tan | |
| 2002/0122400 A1 | 9/2002 | Vayanos et al. | |
| 2002/0128035 A1 | 9/2002 | Jokinen et al. | |
| 2002/0159422 A1 | 10/2002 | Li et al. | |
| 2002/0160781 A1 | 10/2002 | Bark et al. | |
| 2002/0168946 A1 | 11/2002 | Aizawa et al. | |
| 2002/0172293 A1 | 11/2002 | Kuchi et al. | |
| 2002/0176398 A1 | 11/2002 | Nidda | |
| 2002/0191569 A1 | 12/2002 | Sung et al. | |
| 2002/0193146 A1 | 12/2002 | Wallace et al. | |
| 2003/0002464 A1 | 1/2003 | Rezaiifar et al. | |
| 2003/0027579 A1 | 2/2003 | Sydon | |
| 2003/0035491 A1 | 2/2003 | Walton et al. | |
| 2003/0036359 A1* | 2/2003 | Dent et al. | 455/63 |
| 2003/0040283 A1 | 2/2003 | Kawai et al. | |
| 2003/0043732 A1 | 3/2003 | Walton et al. | |
| 2003/0043764 A1 | 3/2003 | Kim et al. | |
| 2003/0063579 A1 | 4/2003 | Lee | |
| 2003/0068983 A1 | 4/2003 | Kim et al. | |
| 2003/0072280 A1 | 4/2003 | McFarland et al. | |
| 2003/0072395 A1 | 4/2003 | Jia et al. | |
| 2003/0073409 A1 | 4/2003 | Nobukiyo et al. | |
| 2003/0073464 A1 | 4/2003 | Giannakis et al. | |
| 2003/0076890 A1 | 4/2003 | Hochwald et al. | |
| 2003/0086393 A1 | 5/2003 | Vasudevan et al. | |
| 2003/0096579 A1 | 5/2003 | Ito et al. | |
| 2003/0103520 A1 | 6/2003 | Chen et al. | |
| 2003/0109226 A1 | 6/2003 | Brunner et al. | |
| 2003/0112745 A1 | 6/2003 | Zhuang et al. | |
| 2003/0123414 A1 | 7/2003 | Tong et al. | |
| 2003/0125040 A1 | 7/2003 | Walton et al. | |
| 2003/0142648 A1 | 7/2003 | Semper | |
| 2003/0147371 A1 | 8/2003 | Choi et al. | |
| 2003/0181170 A1 | 9/2003 | Sim | |
| 2003/0185310 A1 | 10/2003 | Ketchum et al. | |
| 2003/0190897 A1 | 10/2003 | Lei et al. | |
| 2003/0193915 A1 | 10/2003 | Lee et al. | |
| 2003/0202491 A1 | 10/2003 | Tiedemann, Jr. et al. | |
| 2003/0228850 A1 | 12/2003 | Hwang | |
| 2003/0235255 A1 | 12/2003 | Ketchum et al. | |
| 2003/0236080 A1 | 12/2003 | Kadous et al. | |
| 2004/0001429 A1 | 1/2004 | Ma et al. | |
| 2004/0002364 A1 | 1/2004 | Trikkonen et al. | |
| 2004/0009783 A1 | 1/2004 | Miyoshi | |
| 2004/0015692 A1 | 1/2004 | Green et al. | |
| 2004/0017785 A1 | 1/2004 | Zelst | |
| 2004/0048609 A1 | 3/2004 | Kosaka | |
| 2004/0057394 A1 | 3/2004 | Holtzman | |
| 2004/0058687 A1 | 3/2004 | Kim et al. | |
| 2004/0066761 A1 | 4/2004 | Giannakis et al. | |
| 2004/0066772 A1 | 4/2004 | Moon et al. | |
| 2004/0067756 A1 | 4/2004 | Wager et al. | |
| 2004/0072565 A1 | 4/2004 | Nobukiyo et al. | |
| 2004/0076185 A1 | 4/2004 | Kim et al. | |
| 2004/0077345 A1 | 4/2004 | Turner et al. | |
| 2004/0077379 A1 | 4/2004 | Smith et al. | |
| 2004/0081195 A1 | 4/2004 | El-Maleh et al. | |
| 2004/0087325 A1 | 5/2004 | Cheng et al. | |
| 2004/0097215 A1 | 5/2004 | Abe et al. | |
| 2004/0098505 A1 | 5/2004 | Clemmensen | |
| 2004/0105489 A1 | 6/2004 | Kim et al. | |
| 2004/0114618 A1 | 6/2004 | Tong et al. | |
| 2004/0120411 A1 | 6/2004 | Walton et al. | |
| 2004/0125792 A1 | 7/2004 | Bradbury et al. | |
| 2004/0131110 A1 | 7/2004 | Alard et al. | |
| 2004/0136344 A1 | 7/2004 | Kim et al. | |
| 2004/0136349 A1 | 7/2004 | Walton et al. | |
| 2004/0156328 A1 | 8/2004 | Walton et al. | |
| 2004/0160914 A1 | 8/2004 | Sarkar | |
| 2004/0160933 A1 | 8/2004 | Odenwalder et al. | |
| 2004/0166867 A1 | 8/2004 | Hawe | |
| 2004/0166887 A1 | 8/2004 | Laroia et al. | |
| 2004/0170152 A1 | 9/2004 | Nagao et al. | |
| 2004/0170157 A1 | 9/2004 | Kim et al. | |
| 2004/0171384 A1 | 9/2004 | Holma et al. | |
| 2004/0171385 A1 | 9/2004 | Haustein et al. | |
| 2004/0178954 A1* | 9/2004 | Vook et al. | 342/383 |
| 2004/0179480 A1 | 9/2004 | Attar et al. | |
| 2004/0179494 A1 | 9/2004 | Attar et al. | |

(56) References Cited

U.S. PATENT DOCUMENTS

| | | |
|---|---|---|
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0202257 A1 | 10/2004 | Mehta et al. |
| 2004/0208138 A1 | 10/2004 | Hayashi et al. |
| 2004/0219819 A1 | 11/2004 | Di Mascio |
| 2004/0219919 A1 | 11/2004 | Whinnett et al. |
| 2004/0224711 A1 | 11/2004 | Panchal et al. |
| 2004/0228313 A1 | 11/2004 | Cheng et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0030886 A1 | 2/2005 | Wu et al. |
| 2005/0034079 A1 | 2/2005 | Gunasekar et al. |
| 2005/0041611 A1 | 2/2005 | Sandhu |
| 2005/0041618 A1 | 2/2005 | Wei et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous |
| 2005/0053081 A1 | 3/2005 | Andersson et al. |
| 2005/0063298 A1 | 3/2005 | Ling et al. |
| 2005/0068921 A1 | 3/2005 | Liu |
| 2005/0073976 A1 | 4/2005 | Fujii |
| 2005/0084000 A1 | 4/2005 | Krauss et al. |
| 2005/0085236 A1 | 4/2005 | Gerlach et al. |
| 2005/0111397 A1 | 5/2005 | Attar et al. |
| 2005/0122898 A1 | 6/2005 | Jang et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0157807 A1 | 7/2005 | Shim et al. |
| 2005/0159162 A1 | 7/2005 | Park |
| 2005/0164709 A1* | 7/2005 | Balasubramanian et al. 455/453 |
| 2005/0165949 A1 | 7/2005 | Teague |
| 2005/0174981 A1 | 8/2005 | Heath et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0215196 A1 | 9/2005 | Krishnan et al. |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard |
| 2005/0259757 A1 | 11/2005 | Wu et al. |
| 2005/0265293 A1 | 12/2005 | Ro et al. |
| 2005/0265470 A1 | 12/2005 | Kishigami et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1* | 12/2005 | Cudak et al. .................... 710/62 |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim |
| 2006/0045003 A1 | 3/2006 | Choi et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0104333 A1 | 5/2006 | Rainbolt et al. |
| 2006/0104381 A1 | 5/2006 | Menon et al. |
| 2006/0107171 A1 | 5/2006 | Skraparlis |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0193294 A1 | 8/2006 | Jorswieck et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0233124 A1 | 10/2006 | Palanki |
| 2006/0233131 A1 | 10/2006 | Khandekar et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson |
| 2007/0019596 A1 | 1/2007 | Barriac et al. |
| 2007/0025345 A1 | 2/2007 | Bachl et al. |
| 2007/0041404 A1 | 2/2007 | Palanki |

(56) References Cited

U.S. PATENT DOCUMENTS

| | | |
|---|---|---|
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou |
| 2007/0098050 A1 | 5/2007 | Agrawal et al. |
| 2007/0098120 A1 | 5/2007 | Wang |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovic et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhang et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Ho et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0129501 A1 | 5/2009 | Mehta et al. |
| 2009/0180459 A1 | 7/2009 | Orlik et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerter et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0255518 A9 | 10/2011 | Agrawal et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |
| 2013/0315200 A1 | 11/2013 | Gorokhov et al. |
| 2014/0247898 A1 | 9/2014 | Laroia et al. |
| 2014/0376518 A1 | 12/2014 | Palanki et al. |

FOREIGN PATENT DOCUMENTS

| | | |
|---|---|---|
| CA | 2540688 | 5/2005 |
| CA | 2577369 A1 | 3/2006 |
| CL | 14001993 | 12/1994 |
| CL | 8461997 | 1/1998 |
| CL | 9531997 | 1/1998 |
| CL | 27102004 | 8/2005 |
| CL | 22892004 | 9/2005 |
| CL | 30862004 | 10/2005 |
| CL | 29932005 | 5/2006 |
| CL | 15202006 | 6/2006 |
| CL | 2907-2006 | 10/2006 |
| CL | 29012006 | 10/2006 |
| CL | 29022006 | 10/2006 |
| CL | 29032006 | 10/2006 |
| CL | 29042006 | 10/2006 |
| CL | 29062006 | 10/2006 |
| CL | 29082006 | 10/2006 |
| CL | 22032006 | 2/2007 |
| CL | 15212006 | 3/2007 |
| CL | 14922006 | 4/2007 |
| CL | 14892006 | 5/2007 |
| CL | 14902006 | 5/2007 |
| CL | 46151 | 12/2009 |
| CN | 1252919 | 5/2000 |
| CN | 1267437 | 9/2000 |
| CN | 1284795 | 2/2001 |
| CN | 1296682 | 5/2001 |
| CN | 1344451 | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1636346 | 7/2005 |
| CN | 1642051 A | 7/2005 |
| CN | 1642335 A | 7/2005 |
| CN | 1647436 | 7/2005 |
| DE | 19800653 A1 | 7/1999 |
| DE | 19800953 | 7/1999 |
| DE | 199957288 | 5/2001 |
| DE | 10240138 | 8/2003 |
| DE | 10254384 | 6/2004 |
| EP | 0488976 | 6/1992 |
| EP | 0568291 A2 | 11/1993 |
| EP | 0740431 A1 | 10/1996 |
| EP | 0786889 | 7/1997 |
| EP | 0805576 A2 | 11/1997 |
| EP | 0807989 | 11/1997 |
| EP | 0981222 | 2/2000 |
| EP | 1001570 A2 | 5/2000 |
| EP | 1047209 A1 | 10/2000 |
| EP | 1061687 | 12/2000 |
| EP | 1091516 | 4/2001 |
| EP | 1093241 | 4/2001 |
| EP | 1148673 | 10/2001 |

(56) References Cited

FOREIGN PATENT DOCUMENTS

| | | |
|---|---|---|
| EP | 1172983 A2 | 1/2002 |
| EP | 1180907 A2 | 2/2002 |
| EP | 1187506 | 3/2002 |
| EP | 1204217 | 5/2002 |
| EP | 1255369 | 11/2002 |
| EP | 1267513 | 12/2002 |
| EP | 1074099 B1 | 2/2003 |
| EP | 1286490 | 2/2003 |
| EP | 1335504 | 8/2003 |
| EP | 1351538 A1 | 10/2003 |
| EP | 1376920 | 1/2004 |
| EP | 1392073 A1 | 2/2004 |
| EP | 1434365 A2 | 6/2004 |
| EP | 1441469 A2 | 7/2004 |
| EP | 1445873 | 8/2004 |
| EP | 1465449 A1 | 10/2004 |
| EP | 1478204 A2 | 11/2004 |
| EP | 1507421 | 2/2005 |
| EP | 1513356 A2 | 3/2005 |
| EP | 1531575 A2 | 5/2005 |
| EP | 1533950 | 5/2005 |
| EP | 1538863 | 6/2005 |
| EP | 1542488 | 6/2005 |
| EP | 1601149 | 11/2005 |
| EP | 1643669 | 4/2006 |
| EP | 1898542 A1 | 3/2008 |
| EP | 0844796 | 5/2008 |
| EP | 1941693 | 7/2011 |
| FR | 2584884 | 1/1987 |
| GB | 2279540 | 1/1995 |
| GB | 2348776 | 10/2000 |
| GB | 2412541 | 9/2005 |
| IL | 167573 | 2/2011 |
| IL | 201872 | 5/2012 |
| JP | H04111544 A | 4/1992 |
| JP | 4301931 A | 10/1992 |
| JP | H0746248 A | 2/1995 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 A | 12/1998 |
| JP | H11168453 A | 6/1999 |
| JP | 11191756 A | 7/1999 |
| JP | 11196109 A | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000022618 A | 1/2000 |
| JP | 2000102065 A | 4/2000 |
| JP | 2000184425 | 6/2000 |
| JP | 2000511750 A | 9/2000 |
| JP | 2000-332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 | 11/2001 |
| JP | 2001526012 | 12/2001 |
| JP | 2002026790 | 1/2002 |
| JP | 2002111556 A | 4/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 2002538696 A | 11/2002 |
| JP | 200318054 | 1/2003 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003235072 A | 8/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 | 3/2004 |
| JP | 2004507151 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 | 10/2004 |
| JP | 2004297370 A | 10/2004 |
| JP | 2004297756 | 10/2004 |
| JP | 2004534456 | 11/2004 |
| JP | 2004535106 A | 11/2004 |
| JP | 2005-020530 | 1/2005 |
| JP | 2005006337 | 1/2005 |
| JP | 2005502218 T | 1/2005 |
| JP | 2005506757 | 3/2005 |
| JP | 2005110130 A | 4/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 | 7/2005 |
| JP | 2005521358 | 7/2005 |
| JP | 2005236678 A | 9/2005 |
| JP | 2006505172 | 2/2006 |
| JP | 2006506860 A | 2/2006 |
| JP | 2006211537 A | 8/2006 |
| JP | 2006524930 A | 11/2006 |
| JP | 2007503790 | 2/2007 |
| JP | 2007519281 | 7/2007 |
| JP | 2007520309 A | 7/2007 |
| JP | 2007525043 A | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 | 6/2011 |
| KR | 0150275 B1 | 6/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 2004-0103441 | 12/2004 |
| KR | 20040103441 | 12/2004 |
| KR | 20050061559 | 6/2005 |

(56) References Cited

FOREIGN PATENT DOCUMENTS

| | | |
|---|---|---|
| KR | 20050063826 A | 6/2005 |
| KR | 100606099 | 7/2006 |
| RU | 95121152 | 12/1997 |
| RU | 2141168 | 11/1999 |
| RU | 2141706 | 11/1999 |
| RU | 2159007 C2 | 11/2000 |
| RU | 2162275 C2 | 1/2001 |
| RU | 2183387 C2 | 6/2002 |
| RU | 2192094 C1 | 10/2002 |
| RU | 2197778 C2 | 1/2003 |
| RU | 2201033 C2 | 3/2003 |
| RU | 2207723 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 | 11/2003 |
| RU | 2225080 C2 | 2/2004 |
| RU | 2235429 | 8/2004 |
| RU | 2235432 C2 | 8/2004 |
| RU | 2237379 | 9/2004 |
| RU | 2238611 C1 | 10/2004 |
| RU | 2242091 C2 | 12/2004 |
| RU | 2003125268 | 2/2005 |
| RU | 2285388 | 3/2005 |
| RU | 2250564 | 4/2005 |
| RU | 2257008 | 7/2005 |
| RU | 2267224 | 12/2005 |
| RU | 2005129079 A | 2/2006 |
| RU | 2285338 C2 | 10/2006 |
| RU | 2285351 C2 | 10/2006 |
| RU | 2292655 | 1/2007 |
| RU | 2005106258 | 10/2008 |
| RU | 2349043 C2 | 3/2009 |
| SU | 1320883 | 6/1987 |
| TW | 508960 | 11/2002 |
| TW | 510132 | 11/2002 |
| TW | 200302642 | 8/2003 |
| TW | 200401572 | 1/2004 |
| TW | 1232040 | 5/2005 |
| TW | 1248266 | 1/2006 |
| TW | 200718128 | 5/2007 |
| WO | WO9408432 | 4/1994 |
| WO | 9521494 | 8/1995 |
| WO | WO9613920 A1 | 5/1996 |
| WO | WO9701256 | 1/1997 |
| WO | WO9737456 A2 | 10/1997 |
| WO | WO9746033 A2 | 12/1997 |
| WO | WO9800946 | 1/1998 |
| WO | WO9814026 A1 | 4/1998 |
| WO | WO9837706 A2 | 8/1998 |
| WO | WO9848581 A1 | 10/1998 |
| WO | WO9853561 | 11/1998 |
| WO | WO9854919 A2 | 12/1998 |
| WO | 9941871 | 8/1999 |
| WO | WO9944313 | 9/1999 |
| WO | WO9944383 A1 | 9/1999 |
| WO | 9952250 | 10/1999 |
| WO | WO9953713 | 10/1999 |
| WO | WO9959265 | 11/1999 |
| WO | WO9960729 A1 | 11/1999 |
| WO | WO0002397 | 1/2000 |
| WO | WO-0004728 | 1/2000 |
| WO | WO0033503 | 6/2000 |
| WO | WO-0051389 A1 | 8/2000 |
| WO | WO0070897 | 11/2000 |
| WO | WO0101596 | 1/2001 |
| WO | WO0117125 A1 | 3/2001 |
| WO | WO0126269 | 4/2001 |
| WO | WO0139523 A2 | 5/2001 |
| WO | WO0145300 | 6/2001 |
| WO | WO0148969 | 7/2001 |
| WO | 0158054 | 8/2001 |
| WO | WO0160106 | 8/2001 |
| WO | WO-0165637 A2 | 9/2001 |
| WO | WO0169814 A1 | 9/2001 |
| WO | 0182544 | 11/2001 |
| WO | 0189112 | 11/2001 |
| WO | WO0182543 | 11/2001 |
| WO | WO0193505 | 12/2001 |
| WO | WO-0195427 A2 | 12/2001 |
| WO | 0204936 | 1/2002 |
| WO | WO0207375 | 1/2002 |
| WO | WO-0215432 A1 | 2/2002 |
| WO | WO0215616 | 2/2002 |
| WO | WO0219746 | 3/2002 |
| WO | 0231991 | 4/2002 |
| WO | 0233848 | 4/2002 |
| WO | WO-0245293 A2 | 6/2002 |
| WO | WO0245456 A1 | 6/2002 |
| WO | WO0249305 | 6/2002 |
| WO | WO0249306 | 6/2002 |
| WO | WO0249385 A2 | 6/2002 |
| WO | WO02060138 | 8/2002 |
| WO | WO02065675 | 8/2002 |
| WO | 02082743 | 10/2002 |
| WO | WO02082689 A2 | 10/2002 |
| WO | WO02089434 A1 | 11/2002 |
| WO | WO02093782 A1 | 11/2002 |
| WO | WO02093819 A1 | 11/2002 |
| WO | WO02100027 A1 | 12/2002 |
| WO | 03001981 | 1/2003 |
| WO | WO03001696 | 1/2003 |
| WO | WO03001696 A2 | 1/2003 |
| WO | WO03001761 A1 | 1/2003 |
| WO | WO03003617 | 1/2003 |
| WO | WO03019819 | 3/2003 |
| WO | WO03030414 | 4/2003 |
| WO | WO03034644 A1 | 4/2003 |
| WO | WO03043262 | 5/2003 |
| WO | WO03043369 | 5/2003 |
| WO | WO-03049409 A2 | 6/2003 |
| WO | WO03058871 A1 | 7/2003 |
| WO | 03069816 A2 | 8/2003 |
| WO | WO03067783 | 8/2003 |
| WO | WO03069832 | 8/2003 |
| WO | WO03073646 | 9/2003 |
| WO | WO03075479 | 9/2003 |
| WO | WO03085876 | 10/2003 |
| WO | WO03088538 A1 | 10/2003 |
| WO | WO03094384 | 11/2003 |
| WO | WO03103331 | 12/2003 |
| WO | WO2004002047 | 12/2003 |
| WO | 2004008681 | 1/2004 |
| WO | WO2004004370 | 1/2004 |
| WO | WO2004008671 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004030238 | 4/2004 |
| WO | 2004032443 | 4/2004 |
| WO | WO-2004028037 A1 | 4/2004 |
| WO | 2004038972 | 5/2004 |
| WO | 2004040690 | 5/2004 |
| WO | 2004040827 | 5/2004 |
| WO | WO2004038954 | 5/2004 |
| WO | WO-2004038984 A2 | 5/2004 |
| WO | WO2004038988 | 5/2004 |
| WO | 2004051872 | 6/2004 |
| WO | WO2004047354 | 6/2004 |
| WO | WO2004049618 A1 | 6/2004 |
| WO | WO-2004056022 A2 | 7/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |

(56) References Cited

FOREIGN PATENT DOCUMENTS

| | | |
|---|---|---|
| WO | WO2004084509 | 9/2004 |
| WO | WO2004086711 | 10/2004 |
| WO | WO 2004/098072 A2 | 11/2004 |
| WO | WO2004095730 A1 | 11/2004 |
| WO | WO2004095851 | 11/2004 |
| WO | WO2004095854 | 11/2004 |
| WO | WO2004098222 | 11/2004 |
| WO | WO2004102815 | 11/2004 |
| WO | WO2004102816 A2 | 11/2004 |
| WO | 2004114564 A1 | 12/2004 |
| WO | WO2004105272 A1 | 12/2004 |
| WO | WO2004114549 | 12/2004 |
| WO | WO-2004114615 A1 | 12/2004 |
| WO | WO2005002253 A1 | 1/2005 |
| WO | 2005015797 | 2/2005 |
| WO | WO2005011163 A1 | 2/2005 |
| WO | WO2005015795 A1 | 2/2005 |
| WO | WO2005015810 | 2/2005 |
| WO | WO2005015941 | 2/2005 |
| WO | WO2005018270 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | WO2005032004 A1 | 4/2005 |
| WO | WO-2005043780 A1 | 5/2005 |
| WO | WO2005043855 | 5/2005 |
| WO | WO2005046080 | 5/2005 |
| WO | 2005055527 | 6/2005 |
| WO | WO-2005055465 A1 | 6/2005 |
| WO | WO2005055484 A1 | 6/2005 |
| WO | WO2005060192 A1 | 6/2005 |
| WO | 2005065062 | 7/2005 |
| WO | WO2005069538 A1 | 7/2005 |
| WO | WO2005074184 | 8/2005 |
| WO | WO-2005086440 A1 | 9/2005 |
| WO | 2005096538 | 10/2005 |
| WO | WO2005122628 | 12/2005 |
| WO | WO2006007292 A2 | 1/2006 |
| WO | WO2006019710 | 2/2006 |
| WO | 2006026344 | 3/2006 |
| WO | WO2006044487 | 4/2006 |
| WO | WO-2006062356 A1 | 6/2006 |
| WO | WO2006069300 | 6/2006 |
| WO | WO2006069301 | 6/2006 |
| WO | WO2006069397 | 6/2006 |
| WO | WO2006077696 | 7/2006 |
| WO | 2004073276 | 8/2006 |
| WO | 2006099545 | 9/2006 |
| WO | 2006099577 | 9/2006 |
| WO | WO2006096784 | 9/2006 |
| WO | 2006127544 | 11/2006 |
| WO | WO2006134032 | 12/2006 |
| WO | WO2006138196 | 12/2006 |
| WO | WO2006138573 | 12/2006 |
| WO | WO2006138581 A2 | 12/2006 |
| WO | WO-2007022430 A2 | 2/2007 |
| WO | 2007024935 | 3/2007 |
| WO | WO2007024934 A2 | 3/2007 |
| WO | WO2007025160 | 3/2007 |
| WO | WO2007051159 A2 | 5/2007 |
| WO | WO2004086706 A1 | 10/2007 |

OTHER PUBLICATIONS

International Search Report—PCT/US06/012229, International Search Authority—European Patent Office, Jul. 18, 2006.
Digital cellular telecommunications system (Phase 2+); Mobile radio interface layer 3 specification (GSM 4.08 version 7..7.1 Release 1998); ETSI EN 300 940 V7.7.7 (Oct. 2000), pp. 1,2,91-93.
Favre et al: "Self-Adaptive Transmission Procedure" IBM Technical Disclosure Bulletin IBM Corporaton, Sep. 1976, vol. 19, No. 4, pp. 1283-1284, New York, New York.
Groe, et al., "CDMA Mobile Radio Design," Sep. 26, 2001, Artech House, Norwood, MA 02062, pp. 257-259.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
Lettieri et al: "Adaptive frame length control for improving wireless link throughput, range, and energy efficiency", INFOCOM 98. 17th Annual Joint Conference of the IEEE Computer and Communications Societies, Mar. 29-Apr. 2, 1998, pp. 564-571, vol. 2. IEEE San Francisco, CA, New York, New York.
Molisch, et al., MIMO systems with antenna selection, IEEE Microwave Magazine, URL: http://ieeexplore.ieee.org/iel5/6668/28677/01284943.pdf, Retrieved on Dec. 8, 2006, pp. 46-56 (2004).
Tomcik, J.: "QFDD Technology Overview Presentation," IEEE 802.20 Working Group on Mobile Broadband Wireless Access, Slides/pp. 1-73, Nov. 15, 2005.
Tomcik, J.: "MBFDD and MBTDD Wideband Mode: Technology Overview," IEEE 802.20 Working Group Mobile Broadband Wireless Access, Jan. 2006. pp. 1-109, XP002429968.
Toufik I et al., "Channel allocation algorithms for multi-carrier systems", Vehicular Technology Conference, 2004. VTC2004-Fall. 2004 IEEE 60th Los Angeles, CA, USA Sep. 26-29, 2004 (Sep. 26, 2004), pp. 1129-1133, XP010786798, ISBN: 07-7803-8521-7.
TiA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
International Preliminary Report on Patentability—PCT/US06/012229—International Bureau of WIPO—Geneva, Switzerland, Oct. 3, 2007.
Das,Arnab, et al, "Adaptive, asynchronous incremental redundancy (A-IR) with fixed transmission time intervals TTI for HSDPA." IEEE, pp. 10-83-1087.
Written Opinion—PCT/US06/012229, International Search Authority—European Patent Office, Jul. 18, 2006.
3rd Generation Partnership Project; Technical Specification Group Radio Access Network; Physical Layer Aspects for Evolved UTRA (Release 7), 3GPP TR 25.814 v0.3.1 (Nov. 2005).
Bahai, Saltzberg, "System Architecture," Multi-Carrier Digital Communications, Kluwer Academic, New York, NY, XP-002199501, 1999, pp. 17-21.
Bingham, "Other Types of MCM," ADSL, VDSL, and Multicarrier Modulation, John Wiley & Sons, New York, XP-002199502. 2000, pp. 111-113.
Chennakeshu, et al. "A Comparison of Diversity Schemes for a Mixed-Mode Slow Frequency-Hopped Cellular System," IEEE, 1993. pp. 1749-1753.
Chennakeshu, et al. "Capacity Analysis of a TDMA-Based Slow-Frequency-Hopped Cellular System," IEEE Transaction on Vehicular Technology, vol. 45., No. 3 Aug. 1996, pp. 531-542.
Chiani, et al. "Outage Evaluation for Slow Frequency-Hopping Mobile Radio Systems" IEEE Transactions on Communications, vol. 47, No. 12, pp. 1865-1874. Dec. 1999.
Choi, et al., "Design of the Optimum Pilot Pattern for Channel Estimation in OFDM Systems," Global Telecommunications Conference, IEEE Communications Society, pp. 3661-3665, Globecom, Dallas, Texas (2004).
J.S. Chow et al., :"A cost-effective maximum likelihood receiver for multicarrier systems," Proc. IEEE Int. Conf. on Comm., pp. 948-952, Jun. 1992.
Czylwik, "Comparison Between Adaptive OFDM and Single Carrier Modulation with Frequency Domain Equalization," IEEE 47th Vehicular Technology Conference, vol. 2, May 4-7, 1997, pp. 865-869.
Das, et al. "On the Reverse Link Interference Structure for Next Generation Cellular Systems," European Microwave Conference, Oct. 11, 2004, pp. 3068-3072.
Dinis, et at, "A Multiple Access Scheme for the Uplink of Broadband Wireless Systems," IEEE Global Telecommunications Conference, 2004, Globecom '04, vol. 6, Nov. 29 Dec. 3, 2004, pp. 3808-3812.
Fuchs, et al., "A Novel Tree-Based Scheduling Algorithm for the Downlink of Multi-User MIMO Systems with ZF Beamforming,"

(56) References Cited

OTHER PUBLICATIONS

IEEE International Conference on Acoustics, Speech, and Signal Processing, 2005, Proceedings, Philadelphia, PA, pp. 1121-1124.

Hermann Rohling et al , : "Performance Comparison of Different Multiple Access Schemes for the Downlink of an OFDM Communication System", Vehicular Technology Conference, 1997, 47th IEEE, vol. 3, May 4-7, 1997, pp. 1365-1369.

Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.

Je, et al. "A Novel Multiple Access Scheme for Uplink Cellular Systems," IEEE Vehicular Technology Conference, Sep. 26, 2004 pp. 984-988.

Kaleh, "Channel Equalization for Block Transmission Systems," IEEE Journal on Selected Areas in Communications, vol. 13, No. 1, Jan. 1995, pp. 110-121.

Kappes, J.M., and Sayegh, S.I., "Programmable Demultiplexer/Demodulator Processor," COMSAT Laboratories, IEEE, 1990, pp. 230-234.

Karsten Bruninghaus et at., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.

Keller, et al., "Adaptive Multicarrier Modulation: A Convenient Framework for Time-Frequency Processing in Wireless Communications," Proceedings of the IEEE, vol. 88, No. 5, May 2000, pp. 611-640.

Kim, et al. "Performance of TDMA System With SFH and 2-Bit Differentially Detected GMSK Over Rayleigh Fading Channel," IEEE Vehicular Technology Conference, Apr. 28, 1996, pp. 789-793.

Kishiyama Y et al.: "Investigation of Optimum Pilot Channel Structure for VSF-OFCDM Broadband Wireless Access in Forward Link", IEEE Vehicular Technology Conference, New York, NY, US, vol. 4, pp. 139-144, Apr. 22, 2003.

Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.

Kostic, et al. "Fundamentals of Dynamic. Frequency Hopping in Cellular Systems," IEEE Journal on Selected Areas in Communications, vol. 19, No. 11, Nov. 2001, pp. 2254-2266.

Lacroix, et al., "A Study of OFDM Parameters for High Data Rate Radio LAN's," 2000 IEEE 51st Vehicular Technology Conference Proceedings, vol. 2, May 15-18, 2000, pp, 1075-1079.

Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.

Lott, "Comparison of Frequency and Time Domain Differential Modulation in an OFDM System for Wireless ATM," 1999 IEEE 49th Vehicular Technology Conference, vol. 2, Jul. 1999, pp. 877-883.

Mignone, et al., "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.

Naofal Al-Dhahir: "A Bandwidth-Optimized Reduced-Complexity Equalized Multicarrier Transceiver", IEEE Transactions on Communications, vol. 45, No. 8, Aug. 1997.

Naofal Al-Dhahir: "Optimum Finite-Length Equalization for Multicarrier Transceivers", IEEE Trans. On Comm., pp. 56-64, Jan. 1996.

Nassar, Carl R. et al., "High-Performance MC-CDMA via Carrier Interferometry Codes", IEEE Transactions on Vehicular Technology, vol. 50, No. 6, Nov. 2001.

Nassar, Carl R., et al., Introduction of Carrier Interference to Spread Spectrum Multiple Access, Apr. 1999, IEEE, pp. 1-5.

Ntt DoCoMo, et al.: "Orthogonal Common Pilot Channel and Scrambling Code in Evolved UTRA Downlink," 3GPP TSG RAN WG1 #42 on LTE, pp. 1-8 (Aug.-Sep. 2005).

Sari, et al., "Transmission Techniques for Digital Terrestrial TV Broadcasting," IEEE Communications Magazine, Feb. 1995, pp. 100-109.

Schnell, et al, "Application of IFDMA to mobile Radio Transmission," IEEE 1998 International Conference on Universal Personal Communications, vol. 2, Oct. 5-9, 1998, pp. 1267-1272.

Schnell, et al., "A Promising New Wideband Multiple-Access Scheme for Future Mobile Communications Systems," European Transactions on Telecommunications, Wiley & Sons, Chinchester, GB, vol. 10, No. 4, Jul. 1999, pp. 417-427.

Shattil et al., "Array Control Systems for Multicarrier Protocols Using Frequency-Shifted Feedback Cavity", IEEE, 1999.

Sklar: "Formatting and Baseband Transmission", Chapter 2, pp. 54, 104-106.

Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-105.

Sorger U. et al., : "Interleave FDMA—a new spread-spectrum multiple-access scheme", IEEE Int. Conference on Atlanta, GA, USA Jun. 7-11, 1998, XP010284733.

Tellado, "Multicarrier Modulation with Low Par," Kluwer Academic, Dordrecht, NL, XP-002199500, 2000, pp. 6-11 and 55-60.

Tellambura, "Use of m-sequences for OFDM Peak-to-Average Power Ratio Reduction," Electronics Letters, vol. 33, No. 15, Jul. 17, 1997, pp. 1300-1301.

Torrieri, "Cellular Frequency-Hopping CDMA Systems," IEEE Vehicular Technology Conference, May 16, 1999, pp. 919-925.

Xiaodong, et al., "M-Sequences for OFDM Peak-to-Average Power Ratio Reduction and Error Correction," Electronics Letters, vol. 33, Issue 7, Mar. 27, 1997, pp. 554-555.

Zekri, et al., "DMT Signals with Low Peak-to-Average Power Ration," Proceedings, IEEE International Symposium on Computers and Communications, 1999, Jul. 6-8, 1999, pp. 362-368.

Blum, R. et al: "On Optimum MIMO with Antenna Selection," IEEE International Conference on Communications: Conference Proceedings, vol. 1, Apr. 28, 2002, pp. 386-390.

Catreux, S. et al.: "Simulation results for an interference-limited multiple input multiple output cellular system," Global Telecommunications Conference, 2000. Globecom '00. IEEE. Dec. 1, 2000. vol. 2, pp. 1094-1096, http://ieeexplore.ieee.org/iel5/7153/19260/00891306.pdf?tp=&isnumber=19260&arnumber=8913063&punumber=7153.

Chung, S. et al.: "Low complexity algorithm for rate and power quantization in extended V-Blast" VTC Fall 2001. IEEE 54th. Vehicular Technology Conference Proceedings. Atlantic City, NJ, Oct. 7-11, 2001, vol. 1 of 4, pp. 910-914, Conf. 54.

El Gamal, H. et al.: "Universal Space-Time Coding," IEEE Transactions on Information Theory, vol. 49, Issue 5, pp. 1097-1119, XP011074756, ISSN: 0018-9448, May 2003.

"European Search Report—EP10011743, Search Authority—Munich Patent Office, Dec. 20, 2010 (060527EPD1D1)".

European Search Report—EP10012081, Search Authority—Munich Patent Office, Dec. 17, 2010 (060527EPD2).

European Search Report—EP10012082, Search Authority—Munich Patent Office, Dec. 20, 2010 (060527EPD3).

European Search Report—EP10012083, Search Authority—Munich Patent Office, Dec. 30, 2010 (060527EPD4).

Guo, K. Et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.

Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).

Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.

(56) References Cited

OTHER PUBLICATIONS

Kousa, M. et al: "Adaptive Binary Coding for Diversity Communication Systems" IEEE International Conference on Personal Wireless Communications Proceedings, pp. 80-84, XP000992269, (1997).
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Qualcomm Europe: "Description and link simulations for OFDMA based E-UTRA uplink" 3GPP Draft; R1-051100, 3rd Generation Partnership Project (3GPP), Mobile Competence Centre; Sophia-Antipolis Cedex, France, vol. RAN WG1, No. San Diego, USA; Oct. 4, 2005, Oct. 4, 2005, pp. 1-10, XP050100715.
Sumii, Kenji et al.: "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Taiwanese Search Report—095139893—TIPO—Dec. 30, 2010 (060058U2).
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Translation of Office Action in Chinese Application 2006800295980 corresponding to U.S. Appl. No. 11/260,895, citing CN1346221 and CN1383631 dated Feb. 16, 2011 (050917CN).
Translation of Office Action in Japan application 2008-538193 corresponding to U.S. Appl. No. 11/261,065, citing JP11196109, JP10322304 and JP9008725 dated Mar. 8, 2011 (060053JP).
Translation of Office Action in Korean application 10-2007-7031029 corresponding to U.S. Appl. No. 11/260,931, citing US20030202491 and KR20040063057 dated Jan. 28, 2011 (060054U2KR).
Translation of Office Action in Canadian application 2625987 corresponding to U.S. Appl. No. 11/261,065, citing CA2577369 dated Dec. 4, 2011 (060053CA).
Translation of Office Action in Chinese application 200680040236.1 corresponding to U.S. Appl. No. 11/261,065, citing US20040048609 and CN1402916 dated Feb. 18, 2011 (060053CN).
Translation of Office Action in Chinese application 200680048265.2 corresponding to U.S. Appl. No. 11/260,931, citing US6904097, WO04095851, CN1344451 dated Jan. 26, 2011 (060054CN).
Translation of Office Action in Chinese application 200680048832.4 corresponding to U.S. Appl. No. 11/261,158, citing CN1132474 dated Dec. 31, 2010 (060058U2CN).
Translation of Office Action in Japanese Application 2008-514880 corresponding to U.S. Appl. No. 11/445,377, citing JP2007519281 and JP2006505172 dated Nov. 9, 2010 (050396JP).
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011 (050944JP).
Translation of Office Action in Japanese Application 2008-529216 corresponding to U.S. Appl. No. 11/261,159, citing GB2348776 , WO2004098222, WO2005065062 and WO2004102815.Dated Jan. 11, 2011 (051188JP).
Translation of Office Action in Japanese application 2008-538181 corresponding to U.S. Appl. No. 11/511,735, citing WO04064295, JP2002515203, JP8288927, JP7336323 and JP200157545 dated Jan. 25, 2011 (051219JP).
Widdup, B. et al., "A highly-parallel VLSI architecture for a list sphere detector," IEEE International Conference, Paris, France, vol. 5, pp. 2720-2725 (2004).
Wiesel, A. et al.: "Efficient implementation of sphere demodulation" Signal Processing Advances in Wireless Communications, 2003. SPAWC 200 3. 4th IEEE Workshop on Rome. Italy June 15-18, 2003, Piscataway, NJ, USA, IEEE, US, June 15, 2003, pp. 36-40, XP010713463.
Yongmei Dai,; Sumei Sun; Zhongding Lei; Yuan Li.: "A List Sphere Decoder based turbo receiver for groupwise space time trellis coded (GSTTC) systems," 2004 IEEE 59th.
Vehicular Technology Conference, vol. 2, pp. 804-808, May 17, 2004, doi: 10.1109/VETECS.2004.1388940.
Alcatel-Lucent, et al., "Dedicated Reference Signals for Precoding in E-UTRA Downlink" 3GPP Draft; R1-071718, 3rd Generation Partnership Project (3GPP), Mobile Competence Centre ; 650, Route Des Lucioles ; F-06921 Sophia-Antipolis Cedex ; France, vol. RAN WG1, No. St. Julian; 20070403, Apr. 3, 2007, XP050105640 [retrieved on Apr. 3, 2007].
European Search Report—EP10184156—Search Authority—Munich—Jun. 14, 2012 (050676U2EPD1D2).
Physical Channels and Multiplexing in Evolved UTRA Downlink TSG-Ran Working Group 1 Meeting, XX, XX, vol. RI-050590, Jun. 20, 2005, pp. 1-24, XP003006923 the whole document.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
John B. Groe, Lawrence E. Larson, "CDMA Mobile Radio Design" Sep. 26, 2001, Artech House, Norwood, MA02062 580530, XP002397967, pp. 157-159.
S. Nishimura et al., "Downlink Null-Formation Using Receiving Antenna Selection in MIMO/SDMA", Technical Search Report of Electric Information Communication Academic Conference, Feb. 28, 2002, vol. 101, No. 683, pp. 17-22, RCS 2001-286.
TIA/EIA/IS-2000 "Standards for CDMA2000 Spread Spectrum Systems" Version 1.0 Jul. 1999.
TIA/EIA/IS-95 "MOBILE Station-Base Station Compatibility Standard for Dual-Mode Wideband Spread Spectrum Cellular System" Jul. 1993.
3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.
Net Working Group, T. Dierks, C. Allen, Certicom; The TLS Protocol Version 1.0; Jan. 1999.
Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.
Yun et al., "Performance of an LDPC-Coded Frequency-Hopping QFDMA System Based on Resource Allocation in the Uplink" Vehicular Technology-Conference 2004. VTO 2004-Spring, 2004 IEEE 59th Milan, Italy May 17-19, 2004, Piscataway, NJ, USA, vol. 4, May 17, 2004. pp. 1925-1928. XP010766497.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Ken Murakami et al., "Status Toward Standardization at IEEE 802.3ah and Challenge to System Architecture," Technical Report of the Institute of Electronics, Information and Communication Engineers, Jun. 13, 2003, vol. 103, No. 124, pp. 1-6, IN2003-24.
Mats Bengtsson et al: "A Generalization of Weighted Subspace Fitting to Full-Rank Models", IEEE Transactions on Signal Processing, IEEE Service Center, New York, NY, US, vol. 49, No. 5, May 1, 2001.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54,104-106.
Taiwan Search Report—TW095109023—TIPO—Feb. 2, 2012 (050383TW).

(56) References Cited

OTHER PUBLICATIONS

Viswanath P et al: "Opportunistic beamforming using dumb antennas" IEEE Transactions on Information Theory IEEE USA, vol. 48, No. 6, Jun. 2002, pp. 1277-1294, XP002314708 ISSN: 0018-9448 abstract right-hand column, paragraph 1.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Yatawatta S et al: "Energy Efficient Channel Estimation in MIMO Systems", 2005 IEEE International Conference on Acoustics, Speech, and Signal Processing—Mar. 18-23, 2005 Philadelphia, vol. 4, Mar. 18, 2005.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.
Jim Tomcik, QFDD and QTDD: Technology Overview, IEEE 802.20 Working Group on Mobile Broadband Wireless Access, Oct. 28, 2005, pp. 48-50, URL, http://www.ieee802.org/20/contribs/c802.20-05-68.zip.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany June 24-26, 2004. Piscataway, NJ, USA IEEE, June 24, 2004, pp. 143-148, XP010782619, ISBN 0789385136, Para 3, point B.
Nokia: "Compact signalling of multi-code allocation for HSDPA", version 2,3GPP R1-02-0018, Jan. 11, 2002.
Bhushan N., "UHDR Overview", C30-20060522-037, Denver, CO, May 22, 2006, pp. 1-115.
Samsung: "Uplink Transmission and Multiplexing for EUTRA", 3GPP Draft; R1-050605 UL Multiplexing, Jun. 16, 2005, XP050111420.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Tachikawa (Editor); "W-CDMA Mobile Communication Systems," John Wiley & Sons Ltd., Japan, Maruzen: pp. 82-213, Jun. 25, 2001.
LG Electronics: "PAPR comparison of uplink MA schemes", 3GPP TSG RAN WG1 Meeting #41, R1-050475, May 9-13, 2005, pp. 6.
Motorola,"Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1 / DOCS / [retrieved on Feb. 7, 2012].
Tomcik J., "QFDD and QTDD: Proposed Draft Air Interface Specification," IEEE C802.20-05/69, IEEE 802.20 Working Group on Mobile Broadband Wireless Access, Oct. 28, 2005, p. 1-6, 1-7, 1-16, 6-65, 7-11, 7-33, 7-37~7-55, 9-21, 9-22, 9-24~9-32.
Digital cellular telecommunications system (Phase 2+); General Packet Radio Service (GPRS); Mobile Station (MS)- Base Station System (BSS)interface; Radio Link Control/Medium Access Control (RLC/MAC) protocol (GSM 04.60 version 8.4.1 Release 1999), 3GPP Standard; ETSI EN 301 349, 3RD Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.
European Search Report—EP08018386—Search Authority—The Hague—Jul. 18, 2014.
European Search Report—EP10176007—Search Authority—The Hague—Jul. 18, 2014.
Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.
Sommer D., et al., "Coherent OFDM transmission at 60 GHz", Vehicular Technology Conference, 1999, VTC 1999—Fall, IEEE VTS 50th Amsterdam, Netherlands Sep. 19-22, 1999, Piscataway, NJ, USA,IEEE, US, vol. 3, Sep. 19, 1999, pp. 1545-1549, XP010353233, DOI: 10.1109/VETECF.1999.801553, ISBN: 978-0-7803-5435-7.
Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.

\* cited by examiner

SYSTEMS AND METHODS FOR CONTROL CHANNEL SIGNALING

CLAIM OF PRIORITY UNDER 35 U.S.C. §119

This application claims priority to U.S. Provisional Patent Application Ser. No. 60/667,705, filed Apr. 1, 2005 which is incorporated herein by reference in its entirety.

The present claims priority from U.S. patent application Ser. No. 11/186,152 entitled "Systems And Methods For Beamforming In Multi-Input Multi-Output Communication Systems;" U.S. patent application Ser. No. 11/186,697, entitled "Systems And Methods For Beamforming And Rate Control In A Multi-Input Multi-Output Communication Systems;" and U.S. patent application Ser. No. 11/233,844, titled "Systems And Methods For Beamforming Feedback In Multi Antenna Communications Systems," each of which are assigned to the assignee hereof, and expressly incorporated by reference herein.

The present Application for Patent is related to the following co-pending U.S. Patent Applications:

"Varied Signaling Channels For A Reverse Link In a Wireless Communication System" having U.S. application Ser. No. 11/261,806 , filed Oct. 27, 2005, now pending, assigned to the assignee hereof, and expressly incorporated by reference herein; and "Mobile Wireless Access System" , having U.S. Provisional Application No. 60/731,013 , filed Oct. 27, 2005, now expired, assigned to the assignee hereof, and expressly incorporated by reference herein; and "Scalable Frequency Band Operation In Wireless Communication Systems" having U.S. application Ser. No. 11/261,832, filed Oct. 27, 2005, now U.S. Pat. No. 8,582,509 issued on Nov. 12, 2013 and U.S. application Ser. No. 11/261,805, filed Oct. 27, 2005, now U.S. Pat. No. 8,045,512 issued on Oct. 25, 2011, assigned to the assignee hereof, and expressly incorporated by reference herein

BACKGROUND

I. Field

The present document relates generally to wireless communication and, amongst other things, to channel information feedback for wireless communication systems.

II. Background

An orthogonal frequency division multiple access (OFDMA) system utilizes orthogonal frequency division multiplexing (OFDM). OFDM is a multi-carrier modulation technique that partitions the overall system bandwidth into multiple (N) orthogonal frequency subcarriers. These subcarriers may also be called tones, bins, and frequency channels. Each subcarrier is associated with a respective sub carrier that may be modulated with data. Up to N modulation symbols may be sent on the N total subcarriers in each OFDM symbol period. These modulation symbols are converted to the time-domain with an N-point inverse fast Fourier transform (IFFT) to generate a transformed symbol that contains N time-domain chips or samples.

In a frequency hopping communication system, data is transmitted on different frequency subcarriers during different time intervals, which may be referred to as "hop periods." These frequency subcarriers may be provided by orthogonal frequency division multiplexing, other multi-carrier modulation techniques, or some other constructs. With frequency hopping, the data transmission hops from subcarrier to subcarrier in a pseudo-random manner. This hopping provides frequency diversity and allows the data transmission to better withstand deleterious path effects such as narrow-band interference, jamming, fading, and so on.

A problem that must be dealt with in all communication systems is that different transmission techniques of multiple transmission techniques may be utilized for each access terminal. Further, an access terminal may be in communication with multiple base stations. All of these permutations require a great deal of feedback to fully report.

Therefore, it is desired to provide feedback for the utilization of multiple transmission modes and for communication with multiple base stations while minimizing the resources needed to provide the feedback from the receiver to the transmitter.

SUMMARY

One or more aspects are provided that allow for different reverse link reporting types to different sectors. Further, the reporting types may comprise instructions that relate to the type of forward link transmission of the access terminal. The reporting types may also relate to a scheduling mode that is being utilized or being desired to be utilized at the access terminal.

It is understood that other aspects of the present disclosure will become readily apparent to those skilled in the art from the following detailed description, wherein is shown and described only exemplary aspects of the invention, simply by way of illustration. As will be realized, the aspects disclosed are capable of other and different aspects and aspects, and its several details are capable of modifications in various respects, all without departing from the scope of the disclosure.

BRIEF DESCRIPTION OF THE DRAWINGS

The features, nature, and advantages of the present aspects may become more apparent from the detailed description set forth below when taken in conjunction with the drawings in which like reference characters identify correspondingly throughout and wherein.

DETAILED DESCRIPTION

Figure 1:
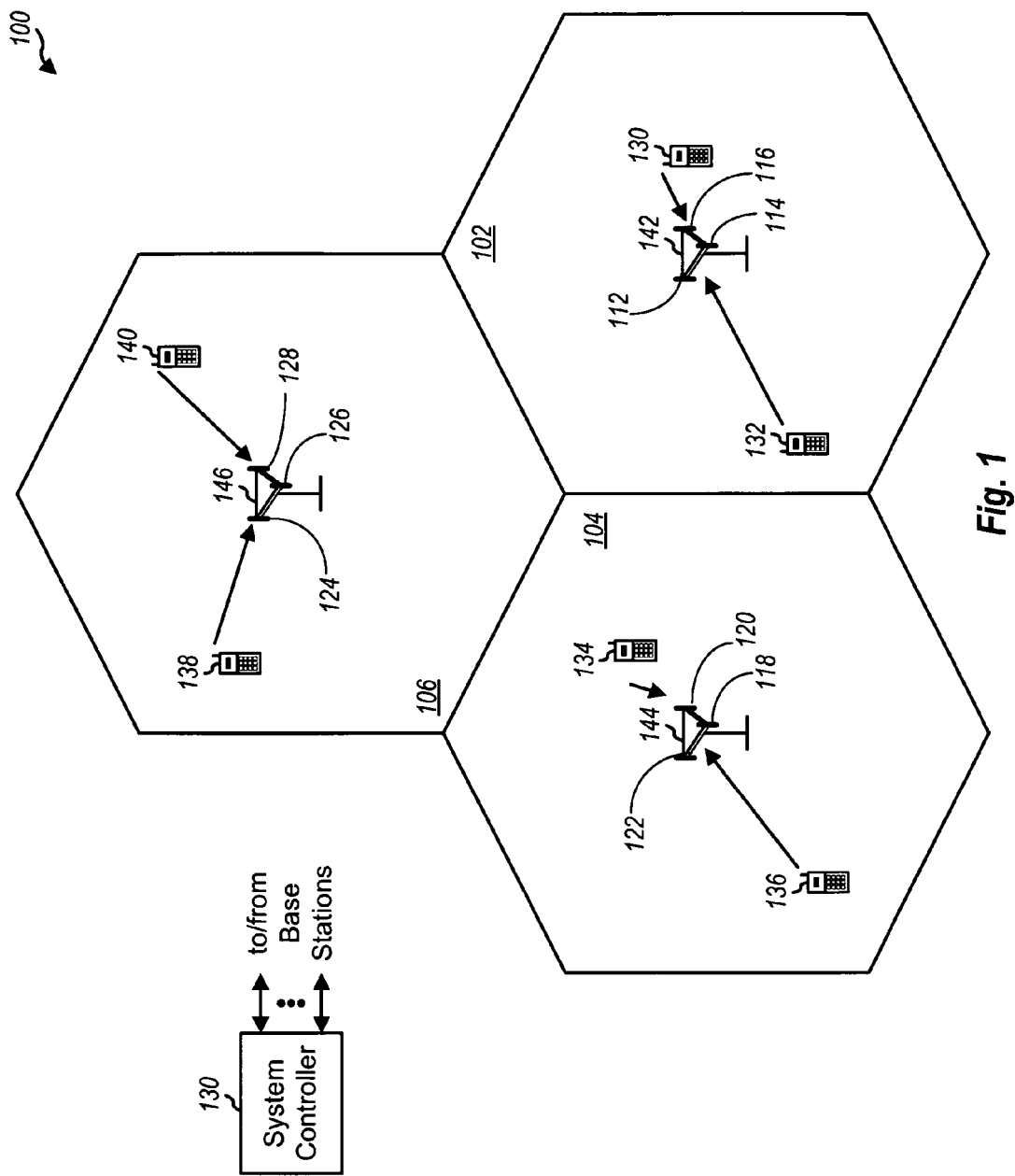
FIG. 1 illustrates aspects of a multiple access wireless communication system.

Referring to FIG. 1, a multiple access wireless communication system according to one aspect is illustrated. A multiple access wireless communication system 100 includes multiple cells, e.g. cells 102, 104, and 106. In the aspect of FIG. 1, each cell 102, 104, and 106 may include an access point 150 that includes multiple sectors. The multiple sectors are formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which are in communication with one or more sectors of each access point. For example, access terminals 130 and 132 are in communication access point 142, access terminals 134 and 136 are in communication with access point 144, and access terminals 138 and 140 are in communication with access point 146. As used herein, transmission from an access point are referred to as forward link and from the access point are referred to as reverse link.

In some aspects, each access terminal 130, 132, 134, 136, 138, and 140 may be in communication with two or more sectors of one or more cells. This may be done in order to allow handoff between different sectors, or cells, for proper capacity management, and/or for other reasons. In order to provide the capability to communicate with multiple sectors it is useful for the access terminal to determine channel conditions with respect to the one or more sectors. This may be done based upon pilot or beacon signals transmitted from the one or more sectors. This channel information, e.g. channel quality information (CQI), may then be provided to each of the one or more sectors in order to allow, for example, more accurate power, rate, and other control for transmission to and from each of the access terminals and to support soft, softer, and other types of handoff.

The set of sectors for which the access terminal has an assigned resource, e.g. a Media Access Control (MAC) ID, belong to what may be termed an access terminal's active set. An exemplary active set may consist of, for example, with respect to access terminal 134 of serving sector 120, along with sectors 118, 122, 124, and 126. In such situations, sectors 118, 122, 124, and 126 may have certain communication with access terminal 134 as described herein.

It should be noted while the above discussion states that MACID is the resource for members of an active set, other resources such as session information, from session with it or another sector, terminal IDs, or other information may be used in addition to, or in lieu of, the MACID.

The last sector from which the access terminal successfully received a forward link assignment may be called the forward link serving sector (FLSS). The last sector from which the access terminal successfully received a reverse link assignment may be called the reverse link serving sector (RLSS). The sector that the access terminal determines is the desired sector for reverse link data transmissions may be called a desired reverse link serving sector (DRLSS). The sector within the active set that the access terminal determines is a desired sector for forward link data transmissions may be called a desired forward link serving sector (DFLSS).

The sectors of the active set are members of one or more synchronous subsets. Different subsets may have different timing, e.g., are synchronized by different sources. The sectors with same timing may be referred to as members of a synchronous subset. The RLSS and FLSS of the access terminal may be members of the same synchronous subset to ease signaling overhead for control messages. In certain aspects, the access terminal may choose the DRLSS to be a member of the same synchronous subset as the RLSS. A synchronous subset that does not contain the FLSS is referred to as a non-synchronous subset.

At the very least, in certain aspects, the access terminal is able to transmit all of the control channel messages available, other than those specifically intended for sectors or access points other than the FLSS, to the FLSS. It may also be able to transmit these messages to members of the same synchronous as the FLSS. In addition, the access terminal may be limited to transmitting only limited control channels to each sector that is a member of a non-synchronous subset.

The actual control channel messages that are to be reported, as well as the frequency and timing of their transmission, to the FLSS or any other sector are based upon instructions from the FLSS or that other sector. The instructions may comprise the type of control channel to be transmitted, along with its timing in terms of frames, frequency, and the number of transmissions may be included in the instructions or additional instructions. Also, requests for single instance reporting may be provided from one or more sectors. Further, each instruction may constitute a request for reporting of one or more control channel types, with the same or different reporting requirement.

It should be noted that an access terminal may transmit all of its control channel messages to the FLSS, regardless of to which sector or access point, the control channel message applies. Also, the access terminal may transmit the control channel message to specific target sector of the control channel message. In addition, a combination of these approaches may be utilized for the different sectors.

Further, in channelized systems, e.g. those where the bandwidth is divided into co-existent carriers where user communication may be constrained in less than all of the bandwidth or carriers, the access terminal may transmit control channels in only the carriers it is constrained to communicate data in and/or other carriers as instructed.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

The transmission techniques described herein may also be used for various wireless communication systems such as a CDMA system, a TDMA system, an FDMA system, an orthogonal frequency division multiple access (OFDMA) system, a single-carrier FDMA (SC-FDMA) system, and so on. An OFDMA system utilizes orthogonal frequency division multiplexing (OFDM), which is a modulation technique that partitions the overall system bandwidth into multiple (K) orthogonal subcarriers. These subcarriers are also called tones, bins, and so on. With OFDM, each subcarrier may be independently modulated with data. An SC-FDMA system may utilize interleaved FDMA (IFDMA) to transmit on subcarriers that are distributed across the system bandwidth, localized FDMA (LFDMA) to transmit on a block of adjacent subcarriers, or enhanced FDMA (EFDMA) to transmit on multiple blocks of adjacent subcarriers. In general, modulation symbols are sent in the frequency domain with OFDM and in the time domain with SC-FDMA.

System 100 may use various subcarrier structures for the forward and reverse links. For a distributed subcarrier structure, the K total subcarriers are arranged into S non-overlapping sets such that each set contains N subcarriers that are uniformly distributed across the K total subcarriers. Consecutive subcarriers in each set are spaced apart by S subcarriers, where $K=S \cdot N$. Thus, set s contains subcarriers s, S+s, 2S+s, ..., (N−1)·S+s, for s∈{1, ..., S}. For a block subcarrier structure, the K total subcarriers are arranged into S non-overlapping sets such that each set contains N consecutive subcarriers. Thus, set s contains subcarriers (s−1)·N+1 through s·N, for s∈{1, ..., S}. In general, the subcarrier structure used for each link may include any number of sets, and each set may include any number of subcarriers that may be arranged in any manner. In an aspect that is assumed for much of the description below, the block subcarrier structure is used for the reverse link.

System 100 may support a single carrier or multiple carriers for each link. In an aspect, multiple (C) subcarriers are available for each carrier supported by the system. Each carrier may also be partitioned into multiple (P) subband. A subband is a range of frequency within the system bandwidth. In an aspect, each carrier spans approximately 5 MHz, C=512, P=4, S=32, and N=16. For this aspect, a single-carrier system has K=512 total subcarriers that are arranged into four subbands, and each subband includes 128 subcarriers. For this aspect, the single-carrier system has 32 subcarrier sets, and each set includes 16 subcarriers. For this aspect, a system with four carriers has K=2048 total subcarriers that are arranged into 16 subbands.

It should be noted that subbands may be segments of a different number of subcarriers than described above, may in total span less than all of the carrier, and may have a different number of subcarriers between one or more of the subbands in each channel.

Figure 2A:
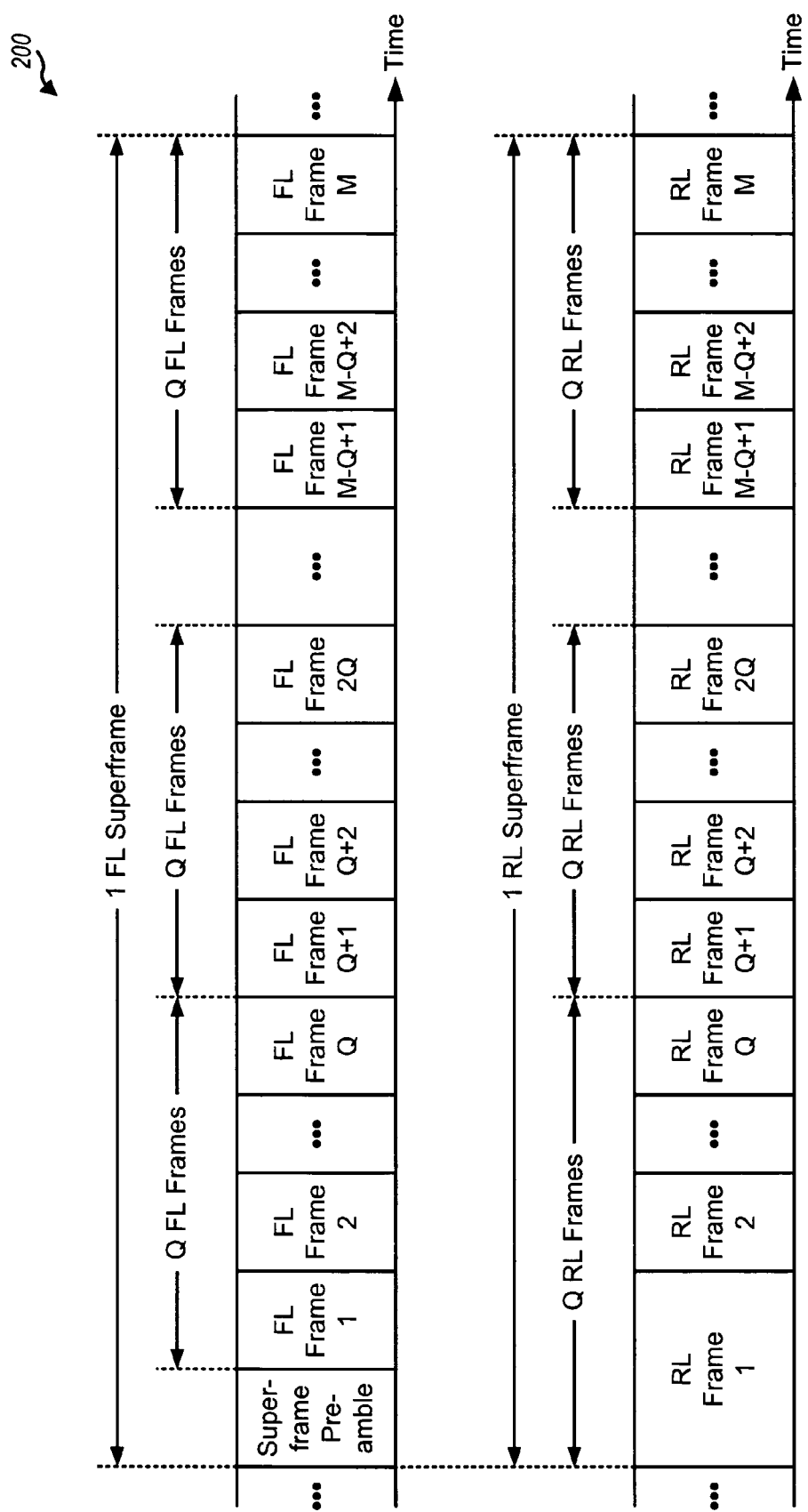
FIG. 2A shows superframe structures for the forward and reverse links.

FIG. 2A shows exemplary superframe structures 200 that may be used for the forward and reverse links. The transmission timeline for each link is partitioned into units of superframes. Each superframe spans a particular time duration, which may be fixed or configurable. For the forward link, each superframe includes a preamble followed by M frames, where M>1. A frame may refer to a time interval in a transmission timeline or a transmission sent during the time interval. The superframe preamble carries overhead information that enables the terminals to receive forward link control channels and subsequently access the system. Each subsequent frame may carry traffic data and/or control channel messages. For the reverse link, each superframe includes M frames, where the first frame may be extended by the length of the superframe preamble on the forward link. The superframes on the reverse link may be substantially time aligned with the superframes on the forward link.

FIG. 2A shows specific superframe structures for the forward and reverse links. In general, a superframe may span any time duration and may include any number of frames and other fields. The superframe structure for the reverse link may be the same or different from the superframe structure for the forward link.

Figure 2B:
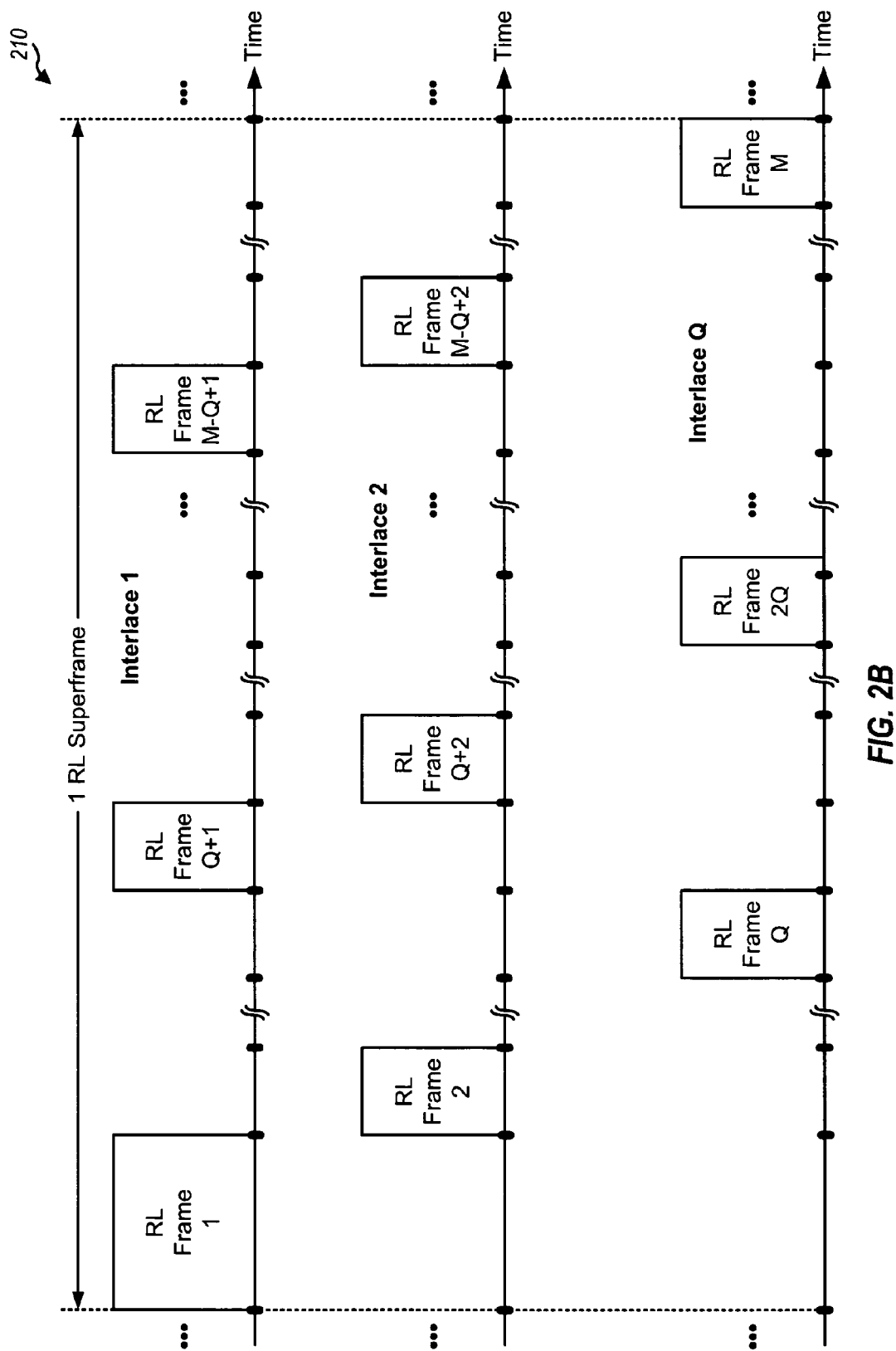
FIG. 2B shows an interlace structure for the reverse link.

FIG. 2B shows an interlace structure 210 for the reverse link. Referring back to FIG. 2A, for each link, the frames in each superframe may be arranged into groups, with each group including Q consecutive frames, where Q>1. Q interlaces may be formed for each link with this grouping of frames. In an aspect, which is shown in FIG. 2B, interlace 1 includes frames 1, Q+1, 2Q+1, and so on, interlace 2 includes frames 2, Q+2, 2Q+2, and so on, and interlace Q includes frames Q, 2Q, 3Q, and so on. The Q interlaces are offset from one another by one frame. In an aspect that is assumed for much of the description below, Q=6, six interlaces are formed and may be used to send six packets in an interlaced manner, one packet in each interlace, as described below.

System 100 may support frequency division duplexed (FDD) and/or time division duplexed (TDD). For FDD, the forward and reverse links are allocated separate frequency bands, and transmissions may be sent simultaneously on the two links, as shown in FIG. 2A. For TDD, the forward and reverse links share the same frequency band, and transmissions for the two links may be sent in different frames. For example, the forward link may be allocated odd-numbered frames, and the reverse link may be allocated even-numbered frames. Alternatively, other allocations, e.g. where one is a multiple of the other, may be utilized as well.

In an aspect, a control segment is sent on the reverse link. The control segment carries various control channel messages for the reverse link. In an aspect, the control segment is mapped to a fixed region of time and frequency in each control frame. A control frame is a frame in which the control segment is sent. In another aspect, the control segment hops in a pseudo-random or deterministic manner from control frame to Control frame to achieve frequency diversity.

Figure 3A:
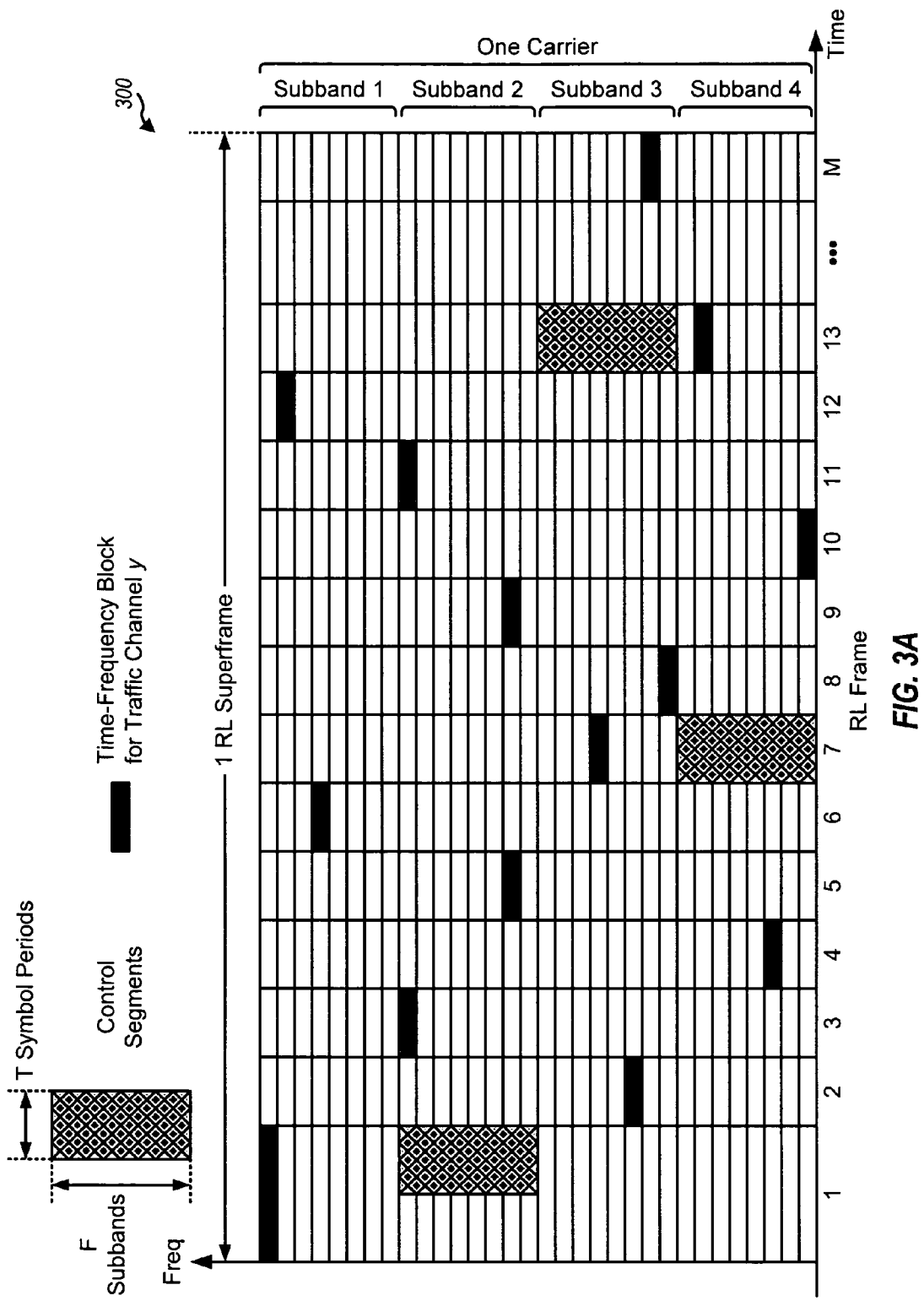
FIGS. 3A and 3B show a frequency hopping control segment with two different sizes for one carrier.

FIG. 3A shows an aspect of a control segment 300 for a single carrier. For this aspect, Q=6 and the control segment is sent on one interlace, or every $6^{th}$ frame. For this aspect, the control segment spans an entire regular-size frame. If the control segment is sent on interlace 1, then for the extended reverse link frame 1, the control segment may be sent in the time interval corresponding to forward link frame 1, as shown in FIG. 3A. If the control segment is sent on interlace 2, 3, 4, 5 or 6, then the control segment may be sent in the entire frame for each frame in that interlace.

Figure 3B:
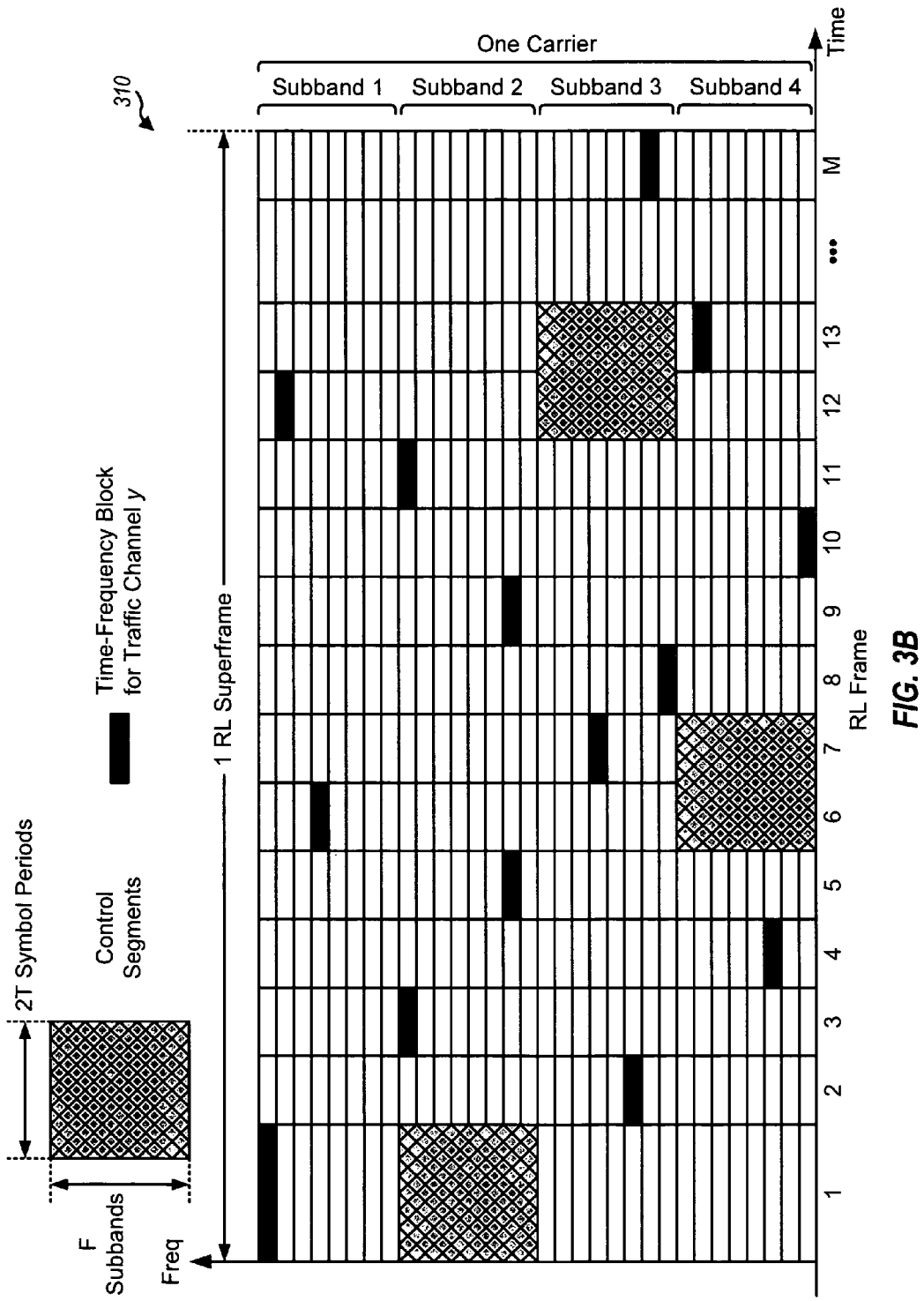

FIG. 3B shows an aspect of an extended control segment 310 for a single carrier. For this aspect, Q=6 and the control segment is sent on one interlace in two regular-size frames. For the aspect shown in FIG. 3B, the control segment is sent in the entire extended reverse link frame 1, reverse link frames 6 and 7, reverse link frames 12 and 13, and so on. The control segment may also be sent in other RF frames for other interlaces.

Sending control channel messages in the control segment across an entire frame as shown in FIG. 3A or across multiple frames as shown in FIG. 3B, instead of across a portion of a frame, may improve link budget for terminals located at the edge of coverage. These terminals typically have an upper limit on transmit power. A longer control segment allows these terminals to transmit control channel messages with more energy spread over a longer period of time, which improves the likelihood of correctly receiving the control channel messages. In general, the control segment may be sent across an entire frame, across a portion of a frame, across multiple frames, across portions of multiple frames, and so on.

In an aspect, the control segment occupies at least one subcarrier in each control frame. For the aspect shown in FIG. 3A, P=4 and the control segment is sent on at least one of the four subcarriers in each control frame. In an aspect that is assumed for much of the description below, the size of the control segment is scalable in frequency, e.g., in units of subcarriers. For this aspect, the control segment may span one, two, or possibly more subcarriers in each control frame. The subcarrier(s) for the control segment may be contiguous or may spread across the system bandwidth. In other aspect, the size of the control segment may be scalable in time or both time and frequency.

In general, the control segment may be mapped to a time-frequency region that covers F subcarriers and spans T symbol periods, where F≥1 and T≥1, as shown in the upper left corner of FIG. 3A. The control segment includes U transmission units, where U=F·T. A transmission unit is one subcarrier in one symbol period. For clarity, much of the following description is for the aspect in which the control segment occupies one or more subcarriers and spans an entire control frame, except for reverse link frame 1. In an aspect, K=512, P=4, and T=8. For this aspect, the control segment (1) covers an integer multiple of 128 subcarriers in 8 symbol periods of a control frame and (2) includes an integer multiple of 1024 transmission units, e.g., 1024, 2048, 3072 or 4096 transmission units.

FIG. 3A also shows frequency hopping for the control segment. The control segment may hop across frequency in different control frames, as shown in FIG. 3A. The frequency hopping may be pseudo-random or deterministic.

FIG. 3A further shows an exemplary frequency-hopping scheme for traffic channels. A traffic channel is a means for sending data from a transmitter to a receiver and may also be called a channel, a physical channel, a physical layer channel, a data channel, and so on. Each traffic channel may be mapped to a specific sequence of time-frequency blocks that hop across frequency in different frames to achieve frequency diversity, as shown in FIG. 3A. In an aspect, a time-frequency block corresponds to one set of subcarriers in one frame. A frequency hopping (FH) pattern indicates the specific time-frequency block to use for each traffic channel in each frame. FIG. 3A shows a sequence of time-frequency blocks for one traffic channel y. The other traffic channels may be mapped to vertically and circularly shifted versions of the time-frequency block sequence for traffic channel y.

In an aspect, the frequency hopping for the traffic channels avoids the control segment. In another aspect, the frequency hopping for the traffic channels is pseudo-random with respect to the control segment. For this aspect, a number of (e.g., eight) subcarrier sets may be allocated for the control segment in each control frame. Each traffic channel that collides with the control segment is then mapped to a subcarrier set allocated to the control segment. For this aspect, the traffic channels and the Control segment swap subcarriers whenever a collision occurs.

Figure 3C:
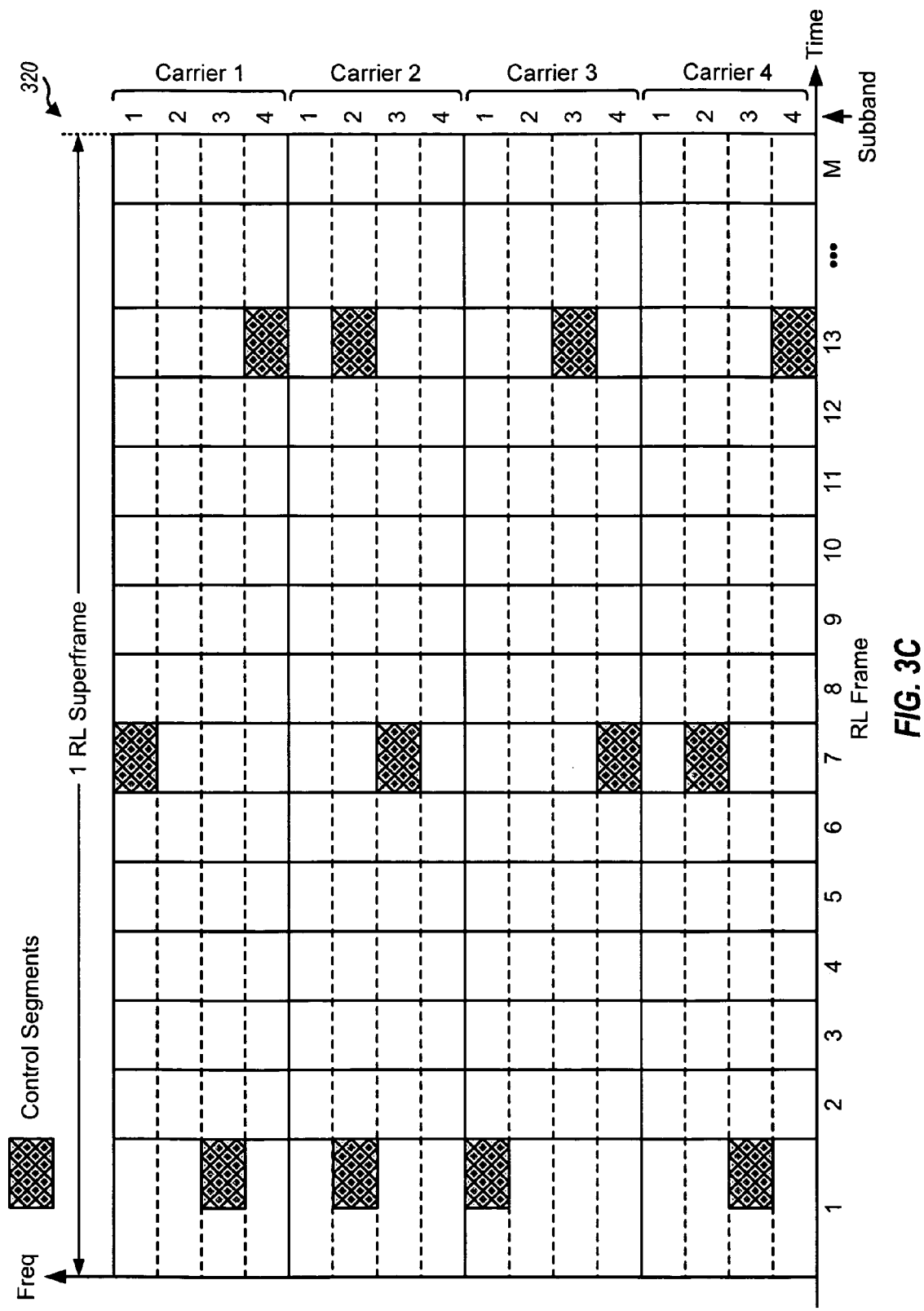
FIG. 3C shows a frequency hopping control segment for four carriers.

FIG. 3C shows an aspect of a frequency hopping control segment 320 for four carriers. For this aspect, one instance of the control segment is provided for each carrier. In an aspect, the control segment instance for each carrier carries reverse link control channel messages for that carrier and is independent of the control segment instances for the other carriers. The four control segment instances for the four carriers (1) may have the same or different sizes, (2) may hop together or independently of one another, and (3) may be sent on one interlace, e.g., every $6^{th}$ frame.

FIGS. 3A and 3B show some aspects of the control segment. In another aspect, the control segment may be sent in multiple interlaces. In yet another aspect, the control segment may be selectively enabled or disabled in each frame in which the control segment might be sent.

System 100 may utilize various control channel messages to support data transmission on the forward and reverse links. The control channel messages typically carry small amounts of control channel messages for the physical layer. The specific control channel messages to use for each link may be dependent on various factors such as, e.g., the manner in which traffic data is transmitted, the manner in which control channel messages is transmitted, the design of the traffic channels and the control channel messages, and so on.

In certain aspects, the reverse link control channels include one or more of a channel quality indicator channel (R-CQICH), spatial directional mode reporting channel (R-BFCH), segment sensitive scheduling channel (R-SFCH), pilot channel (R-PICH), request channel (R-REQCH), and acknowledgement channel (R-ACKCH).

The R-CQICH may be used by the access terminal to transmit forward link channel quality, e.g. quantized CQI values, for different sectors to the access network, to the RLSS or any other sector in its active set to which it can transmit. The R-SFCH is a feedback channel that may be used by the access terminal to transmit the forward link channel quality measured for segments of subcarriers for the FLSS. The R-BFCH is a feedback channel that is used by the access terminal to transmit the beam and supplemental CQI, or complete CQI to enable SDMA, preceding, beamforming, or combinations thereof The R-PICH may be a broadband pilot channel. The R-REQCH may be used by the access terminal to request resources. The R-ACKCH may be used by the access terminal to acknowledge the forward link transmission.

In certain aspects, the access terminal may be instructed to transmit at least one of R-CQICH, R-BFCH, R-SFCH, R-PICH, R-REQCH, and R-ACKCH on the control segment of the FLSS. In addition, the access terminal may be instructed to transmit only the R-CQICH on the control segment of each sector that is a member of non-synchronous subset. For those sectors that are members of the synchronous subset of the FLSS or RLSS, the instructions may be provided for any channel, however, reporting may be constrained by the ability to generate an adequate measurement. Further, in most aspects, reporting to members of the synchronous subset may be limited to R-CQICH.

Several exemplary aspects of the format for the messages of the control channels described above are shown in one or more tables below. In each of the tables, any field of the message may be combined with another field from the message. Further, alternative messages that provide substantially the same information may also be utilized. Also, any reserved fields may be omitted as appropriate.

TABLE 1

Exemplary R-REQCH message format

| Field | Length (bits) |
|---|---|
| QoS Flow | 2 |
| MaxNumSubCarriers | 2 |
| DRLSS | 3 |
| Reserved | 3 |

| | |
|---|---|
| QoSFlow | These bits specify the RLP QoS flow corresponding to the request. The access terminal may indicate the QoS of the highest QoS flow that contains data available for transmission. The QoS priority order may be as follows: 00 highest, 01 second, 10 third, and 11 lowest. |
| MaxNumSubCarriers | These bits specify the maximum number of subcarriers the access terminal can currently support, such that both the buffer level of the QoS flow and the number of subcarriers that the access terminal can support using the available transmit power are satisfied. |
| DRLSS | This field may be set to the 3-bit ActiveSetIndex corresponding to the access terminal's DRLSS. |
| Reserved | The Reserved bits may be set to 0. |

The R-REQCH message may be limited to those access terminals that have no reverse link channel assignments, access terminals in handoff, or those that need additional or different reverse link resources. R-REQCH messages from different access terminals, or at different times, may utilize scrambling or other orthogonal codes to multiplex access terminals over the same subcarriers and time resources.

The information provided via the R-CQICH may be utilized for many purposes including, for example, for rate prediction, forward link power control, beam selection, precoding weight adjustment, and scheduling in various forward link transmission modes. Additionally, in certain aspects, the information of R-CQICH may indicate a request for handoff to another sector by transmitting channel information received from its pilots, when that sector is not the FLSS. In certain aspects, the channel information contained in R-CQICH may vary depending on the type of CQI reports. Each access terminal may support multiple CQI report formats, depending on the CQI reporting mode.

The access terminal's channel feedback reporting mode may be set based upon an instructed reporting mode that is negotiated or otherwise instructed from the access network. The access terminal's reporting mode can be one of the following, or some other mode: the Single Code Word CQI Reporting Mode(CQISCW), the Multiple Code Word CQI Reporting Mode (CQIMCW), or SISO CQI Reporting Mode (CQISISO).

Further, other reporting modes, e.g. those that relate to a specific transmission type, e.g. SDMA, precoding, beamforming, or combinations thereof. In such cases, these modes would be reported using combinations of the control channels that relate to the mode and then report CQICH if instructed.

Examples, of the different reporting modes are shown in Table 2 below.

TABLE 2

Reporting Modes

| | CQIReportingMode | | |
|---|---|---|---|
| | CQISISO | CQISCW | CQIMCW |
| Possible CQI Reports | CQICHPilot CQICHCTRL | CQICHPilot CQICHCTRL CQICHSCW | CQICHPilot CQICHCTRL CQICHMCW |

The format for the CQICHPilot report is shown below. The CQICHPilot report may be sent periodically by each access terminal, at a pre-determined rate, to enable the access network to assess the reverse link control channel performance. The rate and time of CQICHPilot reporting is negotiated with, or otherwise instructed for, each access terminal, and can vary from terminal to terminal based upon any system determined parameters.

TABLE 3

Format for CQICH Pilot Report

| Field | Length (bits) |
|---|---|
| ReservedValue | 10 |

ReservedValue  The Reserved Value is set to 0.

ReservedValue The ReservedValue is set to 0

The format for the CQICHCTRL is shown below in Table 4. This report is primarily used to indicate handoff of the forward link serving sector. Specifically, the fields DFLSS-Flag and ActiveSetIndex may be used to indicate handoff for the forward link sector. This report may also provide the baseline forward link channel quality for all sectors in the active set. This may be used by the access points in different sectors for forward link power control of the forward link control channels.

TABLE 4

Format for CQICHCTRL report

| Field | Length (bits) |
|---|---|
| FormatType | 1 |
| CQIValueSISO | 4 |
| DFLSSFlag | 1 |
| ActiveSetIndex | 3 |
| Reserved | 1 |

| | |
|---|---|
| FormatType | This bit is set to the value 0. |
| CQIValueSISO | Indicates forward link SISO CQI value. |
| DFLSSFlag | If the ActiveSetIndex is the current DFLSS, the DFLSSFlag bit may be set to 1; otherwise, the DFLSSFlag bit may be set to 0. |
| ActiveSetIndex | Indicates the sector to which the CQIValueSISO corresponds. |
| Reserved | This field is set to the value 0. |

Each access terminal may be instructed to report CQICH-CTRL in periodic intervals. The periodicity is negotiated between the access network, via one or more of the sectors, and each access terminal. Each CQICHCTRL transmission can be targeted for different sectors in the active set. The access terminal may choose which target sector to send the CQICHCTRL for.

The format for the CQICHSCW is shown below. This report is used by MIMO-SCW access terminals to indicate the MIMO forward link channel quality. A format bit in this report is used by the access terminals to toggle back and forth between the CQICHSCW and CQICHCTRL report. This toggling feature is needed to allow the SCW access terminals to also send CQICHCTRL report and support handoff. In certain aspects, the access terminal does not send this report to sectors other than the FLSS.

TABLE 5

Format for CQICHSCW report

| Field | Length (bits) |
|---|---|
| FormatType | 1 |
| CQIValueSCW | 5 |
| Rank | 2 |
| Reserved | 2 |

| | |
|---|---|
| FormatType | This bit is set to the value 1. If this bit is set to 0, then the remaining 9 bits are interpreted as corresponding to the CQICHCTRL report. |
| CQIValueSCW | Indicates forward link MIMO SCW CQI value for the reported Rank. |
| Rank | Indicates the desired number of MIMO layers in the forward link MIMO SCW transmission. |
| Reserved | This field is set to the value 0. |

The format for the CQICHMCW is shown below. This report is used by MIMO-MCW access terminals to indicate the MIMO forward link channel quality. A format bit in this report may be used by the access terminals to toggle back and forth between the CQICHMCW and CQICHCTRL report. This toggling feature may be used to allow the SCW access terminals to also send CQICHCTRL report and support handoff. Depending on the number of independent streams being transmitted the CQIMCW message may consist of one or two parts In certain aspects, the access terminal does not send this report to sectors other than the FLSS.

TABLE 6A

Format of first part of CQICHMCW report

| Field | Length (bits) |
|---|---|
| FormatType | 1 |
| MCWIndex | 1 |
| CQIValueMCWLayer1 | 4 |
| CQIValueMCWLayer2 | 4 |

| | |
|---|---|
| FormatType | Indicates the CQIMCW report format. This bit is set to the value 1 when MCW is reported. If this bit is set to 0, then the remaining 9 bits are interpreted as corresponding to the CQICHCTRL report. |
| MCWIndex | This bit is set to the value 0 to indicate the CQI report is the first part of the CQICHMCW report. |
| CQIValueMCWLayer1 | Indicates the forward link MIMO MCW layer 1 CQI value. |
| CQIValueMCWLayer2 | Indicates the forward link MIMO MCW layer 2 CQI value. |

Format of second part of CQICHMCW report

| Field | Length (bits) |
|---|---|
| FormatType | 1 |
| MCWIndex | 1 |
| CQIValueMCWLayer3 | 4 |
| CQIValueMCWLayer4 | 4 |

| | |
|---|---|
| FormatType | Indicates the CQIMCW report format. This bit is set to the value 1 when MCW is reported. If this bit is set to 0, then the remaining 9 bits are interpreted as corresponding to the CQICHCTRL report. |
| MCWIndex | This bit is set to the value 1 to indicate the CQI report is the second part of the CQICHMCW report. |
| CQIValueMCWLayer3 | Indicates the forward link MIMO MCW layer 3 CQI value. |
| CQIValueMCWLayer4 | Indicates the forward link MIMO MCW layer 4 CQI value. |

In certain aspects, the R-SFCH and R-BFSCH messages may be sent in lieu of, or in addition to, R-CQICH messages. This may be done in order to facilitate transmission modes that the access terminal is operating in, while still minimizing the overhead used. Further, the reporting frequency of each these, may as previously discussed, vary as appropriate by the access network instructions.

The CQI value reported for CQICH or SFCH may be a CQI that is computed based upon any gains that are, or may be provided, due to precoding, SDMA, beamforming, or any combination thereof. The factors that are used to calculate the CQI may be chosen by the access terminal based upon its current forward link transmission mode, desired transmission mode, or assigned transmission mode. In some cases, any gains from SDMA may be excluded from the calculations of CQI. The CQI may be, though need not be, calculated to achieve target performance in terms of erasure rate and error rate.

If SDMA is to be employed or desired to be employed for forward link transmission, the BFCH is provided. The access terminal generally transmits the BFCH channel only to the reverse link serving sector, although if it can effectively determine broadcast pilots from another sector in its active set it may provide this other sector as well, especially if the access terminal is requesting or in handoff.

In certain aspects, the channel information contained in R-SFCH may vary depending on the type of reports. The reports can vary depending on the reporting mode. The R-SFCH reports indicate the forward link channel quality on a particular sub-band, segment, or other group of subcarriers. The forward link channel quality can include gains from precoding, beamforming, STTD etc. However, in a certain aspect, the access terminal may choose to only indicate the preferred sub-band, segment, or other group of subcarriers in the R-SFCH report, and not send any information about the forward link channel quality. This is done by setting the CQI value to 0. This feature can be used to increase performance of R-SFCH reports, for example, improve the decoding complexity and performance of R-SFCH report.

TABLE 7

SFCH Report for each CQIReportingMode

| | CQIReportingMode | | |
|---|---|---|---|
| | CQISISO | CQISCW | CQIMCW |
| SFCH Report | SFCHSISO | SFCHSCW | Not defined |

The format for the SFCHSISO report is shown below. This report is used by the SISO access terminal to indicate the forward link channel quality on a particular sub-band, segment, or other group of subcarriers.

TABLE 8

Format for SFCHSISO report

| Field | Length (bits) |
|---|---|
| SubBandIndex | 4 |
| SubBandCQIValueSISO | 4 |
| Reserved | 2 |

| | |
|---|---|
| SubBandIndex | Indicates the subband, segment, or other group of subcarriers for which the SubBandCQIValueSISO is reported. |
| SubBandCQIValueSISO | This field indicates the CQI Value for the reported SubBandIndex. However, the AT may set these bits to 0, to obtain improved performance. This feature can be negotiated between the AP and AT. |
| Reserved | This field is set to the value 0. |

The format for the SFCHSCW report is shown below. This report is used by the SCW access terminal to indicate the MIMO forward link channel quality on a particular sub-band

TABLE 9

Format for SFCHSCW report

| Field | Length (bits) |
|---|---|
| SubBandIndex | 4 |
| SubBandCQIValueSCW | 4 |
| SubBandRank | 2 |

| | |
|---|---|
| SubBandIndex | Indicates the Subband, or other segment identifier, for which the SubBandCQIValueSCW is reported. |
| SubBandCQIValueSCW | This field indicates the CQI Value for the reported SubBandIndex or other segment index. However, the access terminal may set these bits to 0. This feature can be negotiated between the access point and access terminal. |
| SubBandRank | Indicates the desired number of MIMO layers in the forward link MIMO SCW transmission for the reported SubBandIndex or other index. However, the AT may set these bits to 0, to obtain improved performance. This feature can be negotiated between the AP and AT. |

Further, multiple sets of subbands, with each set spanning overlapping parts of the carrier may be stored in a codebook thus allowing multiple ranges of sizes to be scanned for reporting a preferred segment.

In certain aspects, the channel information contained in R-BFCH may vary depending on the type of reports. The reports can vary depending on the reporting mode. The R-BFCH reports indicate the beam index to be used for preceding and SDMA, and a SDMA CQI value offset to enable SDMA transmission. However, in a certain aspect, the access terminal may choose to only indicate the preferred beam-index, and not send any information about the SDMA CQI value offset. This is done by setting the SDMA CQI value offset to 0. This feature can be used to increase performance of R-BFCH reports, for example, improve the decoding complexity and performance of R-BFCH report. In another aspect, the access terminal may indicate SDMA CQI value offset relative to the CQI value sent on the R-SFCH report. In another aspect, the access terminal may indicate SDMA CQI value offset relative to the CQI value sent on the R-CQICH report. In another aspect, the access terminal may indicate an absolute SDMA CQI value that is not relative to or an offset of any other CQI value in R-CQICH or R-SFCH.

The format for the BFCHBeamIndex report is shown below.

| Format for BFCHBeamIndex | |
|---|---|
| Field | Length (bits) |
| BeamIndex | 6 |
| SDMADeltaCQI | 3 |
| Reserved | 1 |

| | |
|---|---|
| BeamIndex | The BeamIndex field indicates the desired beam |
| SDMADeltaCQI | SDMADeltaCQI indicates the integer CQI offset relative to the CQI value in R-SFCH or relative to the CQI Value in R-CQICH. This can be negotiated with the Access Network. |
| Reserved | This bit is set to the value 0. |

In the above, while an offset is reported in these cases, full CQI reporting for the SDMA beam(s) may also be utilized. Further, the same reporting may apply to precoding, where the beamindex may correspond to a codebook entry. The CQI, or delta, may correspond to the beamindex.

The access point can control the periodicity of transmissions of each reverse link control channel on a per-access terminal basis to manage the overall load on the resources dedicated for transmitting channel information.

As discussed there are several types of channel information that the access terminal can feedback, depending on the type of transmission for which the access terminal is scheduled, desired to be scheduled, or otherwise instructed for the forward link. In one operating mode, the access terminal can send R-BFCH to provide feedback that may be used for adaptive preceding and/or SDMA on the forward link. In another mode, the access terminal can send R-SFCH to indicate preferred segments of subcarriers.

The access terminal can transmit more than one reverse link control channel in a given reverse link frame. For example, the access terminal may transmit R-CQICH, R-SFCH and R-BFCH in a same reverse link frame.

The access terminal may transmit a pilot channel (PICH) in the control segment. This pilot sequence may be used, in addition or in lieu of some or all of the channel information reporting described above, to enable adaptive transmission such as reverse link preferred subcarrier or segment scheduling and SDMA in a TDD system.

The availability of all of the reverse link control channels, their average transmission interval and mode may be varied on a sector or access terminal specific basis. If one of these channels is unavailable due to constraints on the control segment, the access point may choose to enable the messages for the channels for specific access terminals through higher layer messages or in the data segments.

In some cases, the messages described above occupy a number of modulation symbols. In the case of orthogonal resources dedicated to channel information transmission, e.g. by using different codes or OFDM symbols, this number of symbols needs to be extended by a number of pilot symbols. Finally, these symbols may be replicated over the reverse link in order to provide channel and interference diversity.

The formats described above are exemplary may have different bit sizes, formats, combinations, or the like. Further, the values reported as CQI may be quantized or raw values.

An access terminal may simultaneously send at most one CQICH report per reverse link frame on each CQICH on the control segment of the RLSS. The access terminal may simultaneously send at most one CQICH report per reverse link frame on each CQICH on each of the sectors in its active. Although, depending on the resources and transmission rate of the access terminal other frequencies of reporting messages to the RLSS and members of the active set may be utilized.

The access terminal determines which synchronous subsets to send CQICH. The access terminal may apply different rules for each sector that has a different timing, because it receives its timing from a different source than one or more other sectors in the active set, that other sectors in its active sets depending on the type of reverse link control channel, the CQI value can indicate the information related to the type of transmission for which the access terminal is reporting. If quantization is being utilized, the access terminal may report the highest tabulated CQI value to allow for early packet termination and a desired system decoding error rate.

If the access terminal desires to be scheduled for a preferred segment of subcarriers or subcarriers the following reporting structure may be followed. The access terminal transmits the SFCH channel only to the reverse link serving sector, although if it can effectively determine broadcast pilots from another sector in its active set it may provide this to the other sector as well, especially if the access terminal is requesting or in handoff.

Figure 4:
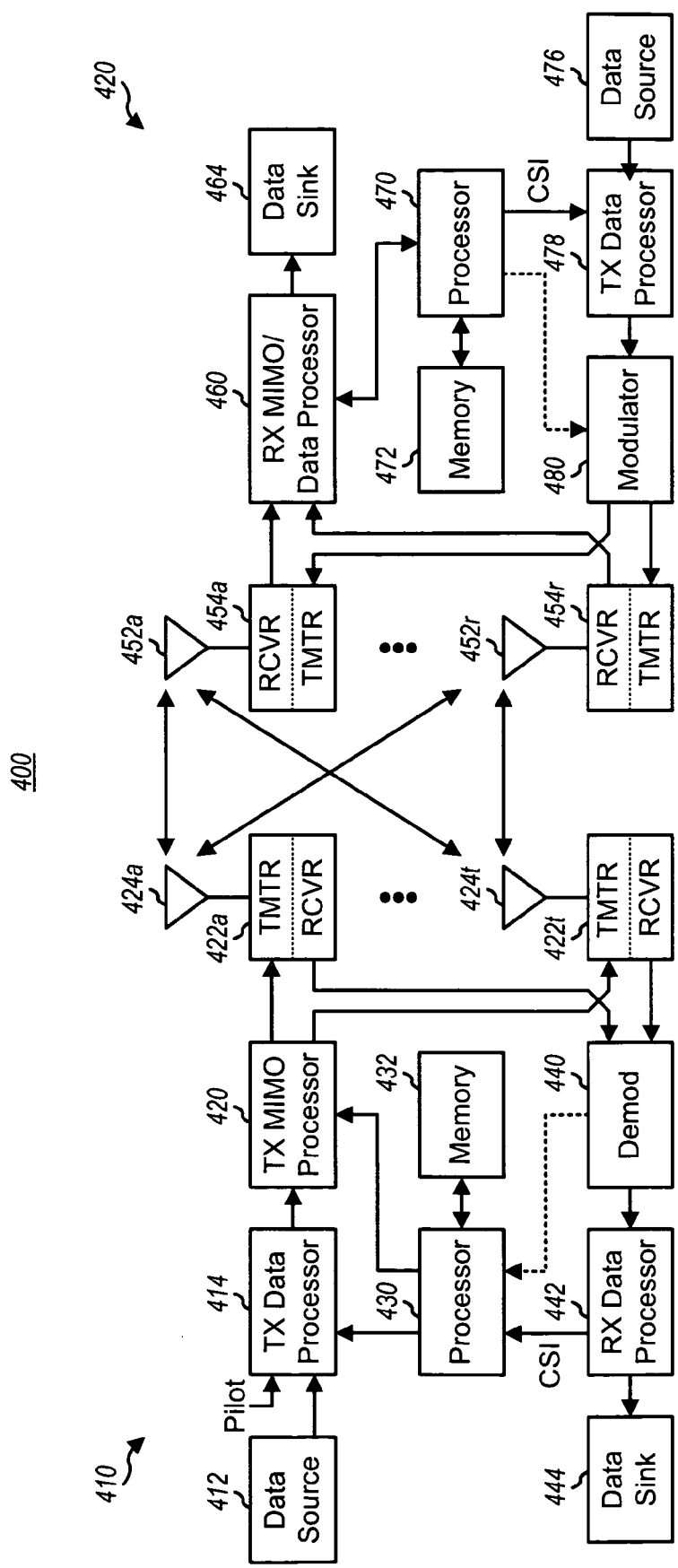
FIG. 4 illustrates aspects of a transmitter and receiver in a multiple access wireless communication system.

Referring to FIG. 4, a transmitter and receiver in a multiple access wireless communication system one aspect is illustrated. At transmitter system 410, traffic data for a number of data streams is provided from a data source 412 to a transmit (TX) data processor 414. In an aspect, each data stream is transmitted over a respective transmit antenna. TX data processor 414 formats, codes, and interleaves the traffic data for each data stream based on a particular coding scheme selected for that data stream to provide coded data. In some aspects, TX data processor 414 applies beamforming weights to the symbols of the data streams based upon the user to which the symbols are being transmitted and the antenna from which the symbol is being transmitted. In some aspects, the beamforming weights may be generated based upon eigenbeam vectors generated at the receiver 402 and provided as feedback to the transmitter 400. Further, in those cases of scheduled transmissions, the TX data processor 414 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed on provided by processor 430. As discussed above, in some aspects, the packet format for one or more streams may be varied according to the rank information that is transmitted from the user.

The modulation symbols for all data streams are then provided to a TX MIMO processor 420, which may further process the modulation symbols (e.g., for OFDM). TX MIMO processor 420 then provides $N_T$ modulation symbol streams to $N_T$ transmitters (TMTR) 422a through 422t. In certain aspects, TX MIMO processor 420 applies beamforming weights, fixed or access terminal specific, or precoding weights to the symbols of the data streams based upon the user to which the symbols are being transmitted and the antenna from which the symbol is being transmitted from that users channel response information.

Each transmitter 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 422a through 422t are then transmitted from $N_T$ antennas 424a through 424t, respectively.

At receiver system 450, the transmitted modulated signals are received by $N_R$ antennas 452a through 452r and the received signal from each antenna 452 is provided to a respective receiver (RCVR) 454. Each receiver 454 conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ receivers 454 based on a particular receiver processing technique to provide $N_T$ "detected" symbol streams. The processing by RX data processor 460 is described in further detail below. Each detected symbol stream includes symbols that are estimates of the modulation symbols transmitted for the corresponding data stream. RX data processor 460 then demodulates, deinterleaves, and decodes each detected symbol stream to recover the traffic data for the data stream. The processing by RX data processor 460 is complementary to that performed by TX MIMO processor 420 and TX data processor 414 at transmitter system 410.

The channel response estimate generated by RX processor 460 may be used to perform space, space/time processing at the receiver, adjust power levels, change modulation rates or schemes, or other actions. RX processor 460 may further estimate the signal-to-noise-and-interference ratios (SNRs) of the detected symbol streams, and possibly other channel characteristics, and provides these quantities to a processor 470. RX data processor 460 or processor 470 may further derive an estimate of the "operating" SNR for the system. Processor 470 then provides estimated channel information (CSI), which may comprise various types of information regarding the communication link and/or the received data stream. For example, the CSI may comprise only the operating SNR. The type of CQI provide, e.g. CQICH (SISO, SCW, and MCW), BFCH, and/or SFCH is determined based upon the currently scheduled for the access terminal, instructions, or desired transmission mode. The CSI is then processed by a TX data processor 438, which also receives traffic data for a number of data streams from a data source 476, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to recover the CSI reported by the receiver system. The reported CSI is then provided to processor 430 and used to (1) determine the data rates and coding and modulation schemes to be used for the data streams and (2) generate various controls for TX data processor 414 and TX MIMO processor 420.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

For a full-rank MIMO channel, where $N_S = N_T \leq N_R$, an independent data stream may be transmitted from each of the $N_T$ transmit antennas. The transmitted data streams may experience different channel conditions (e.g., different fading and multipath effects) and may achieve different signal-to-noise-and-interference ratios (SNRs) for a given amount of transmit power. Moreover, in those cases that successive interference cancellation processing is used at the receiver to recover the transmitted data streams, and then different SNRs may be achieved for the data streams depending on the specific order in which the data streams are recovered. Consequently, different data rates may be supported by different data streams, depending on their achieved SNRs. Since the channel conditions typically vary with time, the data rate supported by each data stream also varies with time.

The MIMO design may have two modes of operation, single code word (SCW) and multiple-code word (MCW). In MCW mode, the transmitter can encode the data transmitted on each spatial layer independently, possibly with different rates. The receiver employs a successive interference cancellation (SIC) algorithm which works as follows: decode the first layer, and then subtract its contribution from the received signal after re-encoding and multiplying the encoded first layer with an "estimated channel," then decode the second layer and so on. This "onion-peeling" approach means that each successively decoded layer sees increasing SNR and hence can support higher rates. In the absence of error-propagation, MCW design with SIC achieves maximum system transmission capacity based upon the channel conditions.

In a SCW mode design, the transmitter encodes the data transmitted on each spatial layer with "identical data rates." The receiver can employ a low complexity linear receiver such as a Minimum Mean Square Solution (MMSE) or Zero Frequency (ZF) receiver, or non-linear receivers such as QRM, for each tone. This allows reporting of the channel estimates by the receiver to be for only the "best" layer and reduced transmission overhead for providing this information.

Figure 5:
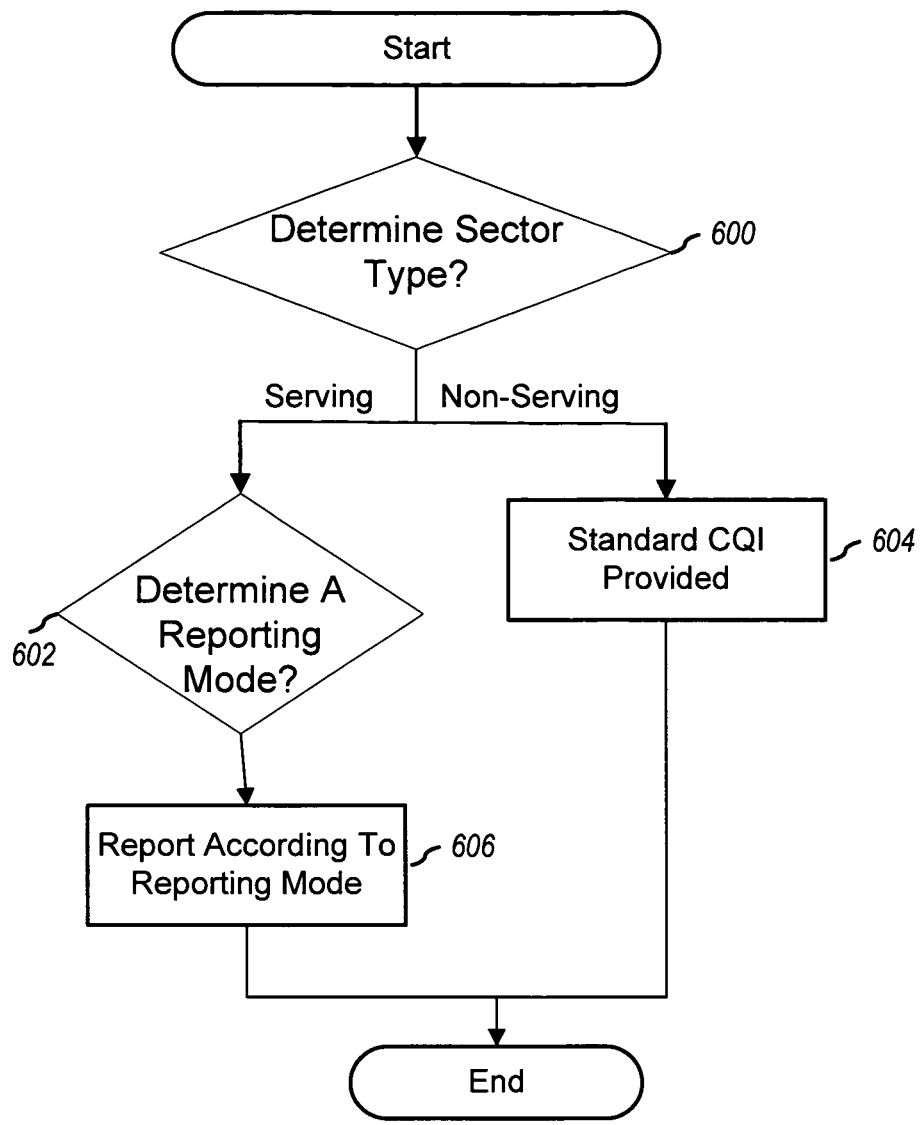
FIG. 5 illustrates aspects of a method of determining a feedback type to provide.
Figure 6:
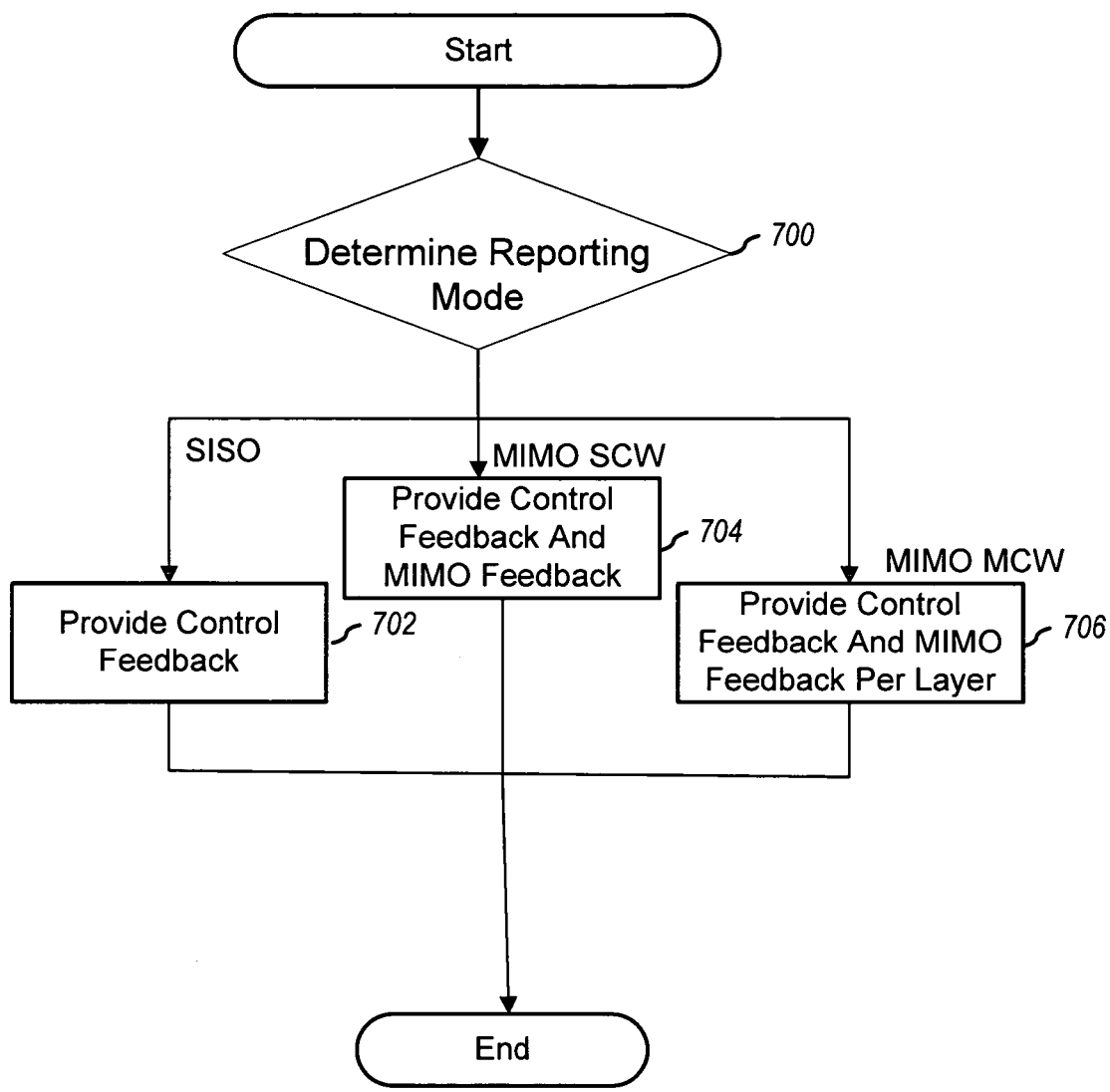
FIG. 6 illustrates aspects of another method of determining a feedback type to provide.

While FIG. 4 and the associated discussion refers to a MIMO system, other systems multi-input single-input (MISO) and single-output multi-input (SIMO) may also utilize the structures of FIG. 4 and the structures, methods and systems discussed with respect to FIGS. 1, 5, and 6 herein.

Referring to FIG. 5, aspects of a method of determining a feedback type to provide is illustrated. A determination is made as to the applicable sector for which feedback is being provided, block 600. If the sector is a non-serving sector, only one of the CQICHCTRL is provided, block 604. If the sector is a serving sector, all CQI reports can be transmitted, block 602.

If the sector is a serving sector, then the reporting type is determined by the access terminal, block 602. This may be based upon an instruction from the FLSS or other sector. The feedback, e.g. reporting mode message(s), is provided then according to the reporting type. The frequency of the reporting is according to instructions, which may vary over time, received from the FLSS or other sector.

Referring to FIG. 6 aspects of another method of determining CQI reports to provide is illustrated. A determination is made as to the reporting mode. The reporting mode may be signaled using an assignment message that relates to the active set, from the FLSS or other members of the active set. The reporting modes, as previously described, may be a SISO mode, MIMO SCW mode, and a MIMO MCW mode. Additional, reporting modes may be available for SDMA, preceding, beamforming, and other transmission types.

In SISO mode, a control channel CQI, e.g. CQICHCTRL, type feedback is provided, block 702. In MIMO-SCW mode, a control channel CQICHCTRL and CQICHSCW feedback is provided, block 704. An example of the MIMO feedback provided for a MIMO SCW is shown in, and discussed above. In MIMOMCW mode a control channel CQICHCTRL and CQICHMCW feedback is provided, block 706. An example of the MIMO feedback provided for a MIMO SCW is shown in, and discussed with above.

The above processes may be performed utilizing TX processor 420 or 460, processor 430 or 470, and memory 432 or 472. Further processes, operations, and features described with respect to FIGS. 1, 5, and 6 may be performed on any processor, controller, or other processing device and may be stored as computer readable instructions in a computer readable medium as source code, object code, or otherwise.

The techniques described herein may be implemented by various means. For example, these techniques may be implemented in hardware, software, or a combination thereof. For a hardware implementation, the processing units within a access point or a access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

It should be noted that the concept of channels herein refers to information or transmission types that may be transmitted by the access point or access terminal. It does not require or utilize fixed or predetermined blocks of subcarriers, time periods, or other resources dedicated to such transmissions.

The previous description of the disclosed aspects is provided to enable any person skilled in the art to make or use the features, functions, operations, and aspects disclosed herein. Various modifications to these aspects may be readily apparent to those skilled in the art, and the generic principles defined herein may be applied to other aspects without departing from their spirit or scope. Thus, the present disclosure is not intended to be limited to the aspects shown herein but is to be accorded the widest scope consistent with the principles and novel features disclosed herein.

The invention claimed is:

1. A wireless communication apparatus comprising:
a memory; and
a processor coupled with the memory, the processor configured to select a type of channel information feedback from among a plurality of reverse link reporting types, based on a type of sector, wherein the type of sector is either serving or non-serving, wherein the type of channel information feedback comprises at least one of a spatial division multiple access channel quality indicator (SDMA CQI), a preferred segment channel quality indicator (CQI), a multiple code word (MCW) channel quality indicator, a single code word (SCW) channel quality indicator, or a single input single output (SISO) channel quality indicator.

2. The wireless communication apparatus of claim 1, wherein the processor is configured to select from among the plurality of reverse link reporting types based upon an instruction from another sector.

3. The wireless communication apparatus of claim 1, wherein the processor is configured to select multiple reporting types from among the plurality of reverse link reporting types for multiple messages based upon the sector type.

4. The wireless communication apparatus of claim 1, wherein the processor is configured to select from among the plurality of reverse link reporting types based upon a type of transmission mode on a forward link to the wireless communication apparatus.

5. The wireless communication apparatus of claim 1, wherein the processor is configured to select two reporting types from among the plurality of reverse link reporting types in one message, one reporting type including a channel quality indicator (CQI) value and the other reporting type including an offset of the CQI value.

6. The wireless communication apparatus of claim 1, wherein the processor is configured to select from among the plurality of reverse link reporting types based upon a type of desired transmission mode on a forward link to the wireless communication apparatus.

7. A method comprising:
transmitting first channel information according to a first reporting type to a first sector;
transmitting second channel information according to the first reporting type to a second sector;
transmitting third channel information according to a second reporting type to the first sector; and
transmitting fourth channel information according to the first reporting type to the second sector,
wherein the first reporting type and the second reporting type are selected from among a plurality of reverse link reporting types, based on a type of sector, wherein the type of sector is either serving or non-serving;
wherein the second reporting type comprises at least one of information identifying a preferred segment, information identifying a preferred spatial division multiple access (SDMA) index, a multiple code word (MCW)

reporting format, a single code word (SCW) reporting format, or a single input single output (SISO) reporting format.

8. The method of claim 7, wherein the first sector comprises a serving sector and the second sector comprises a non-serving sector.

9. The method of claim 7, further comprising transmitting fifth channel information according to a first format to the second sector.

10. The method of claim 7, wherein the channel information comprises a channel quality indicator (CQI).

11. The method of claim 7, wherein the first sector comprises a member of a synchronous subset and the second sector comprises a member of a non-synchronous subset.

12. A wireless communication apparatus comprising:
means for transmitting first channel information according to a first reporting type to a first sector;
means for transmitting second channel information according to the first reporting type to a second sector;
means for transmitting third channel information according to a second reporting type to the first sector; and
means for transmitting fourth channel information according to the first reporting type to the second sector,
wherein the first reporting type and the second reporting type are selected from among a plurality of reverse link reporting types, based on a type of sector, wherein the type of sector is either serving or non-serving;
wherein the second reporting type comprises at least one of information identifying a preferred segment, information identifying a preferred spatial division multiple access (SDMA) index, a multiple code word (MCW) reporting format, a single code word (SCW) reporting format, or a single input single output (SISO) reporting format.

13. The wireless communication apparatus of claim 12, wherein the first sector comprises a serving sector and the second sector comprises a non-serving sector.

14. The wireless communication apparatus of claim 12, further comprising means for transmitting a fifth channel information according to the first reporting type to the second sector.

15. The wireless communication apparatus of claim 12, wherein the channel information comprises a channel quality indicator (CQI).

16. The wireless communication apparatus of claim 12, wherein the first sector comprises a member of a synchronous subset and the second sector comprises a member of a non-synchronous subset.

17. A method comprising:
determining a sector type for a sector, wherein the sector type is either serving or non-serving;
selecting a reporting mode based on the determined sector type, wherein the reporting mode is used to determine a reporting type from among a plurality of reverse link reporting types; and
generating a type of channel information feedback based on the sector type and the reporting type;
wherein the type of channel information feedback comprises at least one of a spatial division multiple access channel quality indicator (SDMA CQI), a preferred segment channel quality indicator (CQI), a multiple code word (MCW) channel quality indicator, a single code word (SCW) channel quality indicator, or a single input single output (SISO) channel quality indicator.

18. The method of claim 17, wherein the selection comprises selecting the reporting type based upon an instruction from another sector.

19. The method of claim 17, wherein the selection further comprises selecting multiple reporting types for multiple messages based upon the reporting mode.

20. The method of claim 17, wherein the selection comprises selecting based upon a type of transmission mode on a forward link to the wireless communication apparatus.

21. The method of claim 17, wherein the selection further comprises selecting two message formats for one message, wherein one format is a channel quality indicator (CQI) value and the other format is an offset of the CQI value.

22. An apparatus for wireless communication comprising:
means for determining a sector type, wherein the sector type is serving or non-serving;
means for determining a reporting mode, wherein the reporting mode is single input single output (SISO), multiple input multiple output single code word (MIMO SCW) or multiple input multiple output multiple code word (MIMO MCW); and
means for selecting a type of channel information feedback from among a plurality of reverse link reporting types based upon the sector type and the reporting mode;
wherein the type of channel information feedback comprises at least one of a spatial division multiple access channel quality indicator (SDMA CQI), a preferred segment channel quality indicator (CQI), a multiple code word (MCW) channel quality indicator, a single code word (SCW) channel quality indicator, or a single input single output (SISO) channel quality indicator.

23. The apparatus of claim 22, wherein the means for selecting comprises means for selecting based upon an instruction.

24. A computer program product, comprising:
a non-transitory computer-readable medium comprising:
code for causing at least one computer t to select a type of channel information feedback from among a plurality of reverse link reporting types, based on a type of sector;
wherein the type of sector is either serving or non-serving;
wherein the type of channel information feedback comprises at least one of a spatial division multiple access channel quality indicator (SDMA CQI), a preferred segment channel quality indicator (CQI), a multiple code word (MCW) channel quality indicator, a single code word (SCW) channel quality indicator, or a single input single output (SISO) channel quality indicator.

25. The computer program product of claim 24, wherein the non-transitory computer-readable medium further comprises code for causing the at least one computer to select from among the plurality of reverse link reporting types based upon an instruction from another sector.

26. The computer program product of claim 24, wherein the non-transitory computer-readable medium further comprises code for causing the at least one computer to select multiple reporting types from among the plurality of reverse link reporting types for multiple messages based upon the sector type.

27. The computer program product of claim 24, wherein the non-transitory computer-readable medium further comprises code for causing the at least one computer to select from among the plurality of reverse link reporting types based upon a type of transmission mode on a forward link to a wireless communication apparatus.

28. The computer program product of claim 24, wherein the non-transitory computer-readable medium further comprises code for causing the at least one computer to select two reporting types from among the plurality of reverse link reporting types in one message, one reporting type including a channel quality indicator (CQI) value and the other reporting type including an offset of the CQI value.

* * * * *